United States Patent
Ranganathan et al.

(10) Patent No.: US 10,839,595 B2
(45) Date of Patent: Nov. 17, 2020

(54) APPARATUS AND METHOD FOR OPTIMIZING A HIERARCHICAL DEPTH BUFFER

(71) Applicant: Intel Corporation, Santa Clara, CA (US)

(72) Inventors: Vasanth Ranganathan, El Dorado Hills, CA (US); Saikat Mandal, Sacramento, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/275,270

(22) Filed: Feb. 13, 2019

(65) Prior Publication Data
US 2020/0258292 A1 Aug. 13, 2020

(51) Int. Cl.
*G06T 15/40* (2011.01)

(52) U.S. Cl.
CPC .................. *G06T 15/405* (2013.01)

(58) Field of Classification Search
CPC .............................................. G06T 15/40–405
See application file for complete search history.

(56) References Cited

U.S. PATENT DOCUMENTS

| | | | |
|---|---|---|---|
| 2012/0299910 A1* | 11/2012 | Liang ............... | G06T 15/405 345/419 |
| 2015/0109293 A1* | 4/2015 | Wang ................ | G06T 1/60 345/422 |
| 2015/0187125 A1* | 7/2015 | Hasselgren ......... | G06T 15/405 345/422 |
| 2017/0024927 A1* | 1/2017 | Isomaki ............. | G06T 11/40 |
| 2018/0158233 A1* | 6/2018 | Wyman .............. | G06T 15/503 |

* cited by examiner

*Primary Examiner* — Charles Tseng
(74) *Attorney, Agent, or Firm* — Nicholson De Vos Webster & Elliott LLP

(57) ABSTRACT

Apparatus and method for optimizing a hierarchical depth buffer. For example, one embodiment of a method comprises: rasterizing primitives of a current graphics image to generate pixels; generating coverage data associated with a first primitive to identify pixels in a first tile of pixels which are partially covered or fully covered by the first primitive; estimating potential minimum (min) and maximum (max) values for the first primitive at edges of a bounding box surrounding the first primitive within the first tile; and adjusting the potential min and/or max values to be closer to actual min and/or max values, respectively, upon a determination that the potential min and/or max values identify one or more pixels which are not partially or fully covered by the primitive.

21 Claims, 29 Drawing Sheets

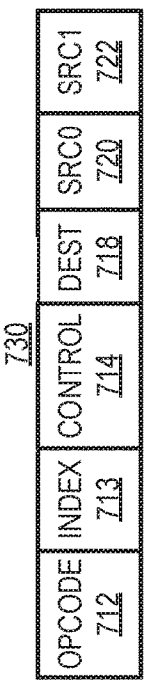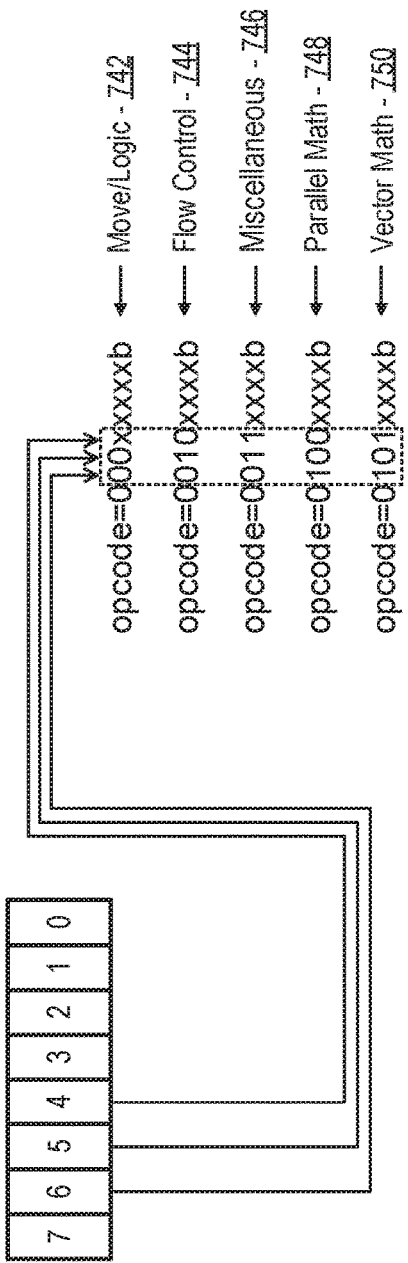
FIG. 7

APPARATUS AND METHOD FOR OPTIMIZING A HIERARCHICAL DEPTH BUFFER

BACKGROUND

Field of the Invention

This invention relates generally to the field of graphics processors. More particularly, the invention relates to an apparatus and method for optimizing a hierarchical depth buffer.

Description of the Related Art

In a modern depth pipeline pass, the graphics processor typically conducts a coarse depth pre-shader depth or 'Z' test. This Z test is based on a separate compressed depth buffer that is maintained based on pre-shader Z data. Coarse depth data (HiZ) is represented as min/max ranges covering rectangular sections of the per-pixel depth buffer. For every incoming source, a min and max are computed to compare against the destination values for depth testing, and it is very important to generate these values as close as possible to the true values so as to perform optimum occlusion culling.

BRIEF DESCRIPTION OF THE DRAWINGS

A better understanding of the present invention can be obtained from the following detailed description in conjunction with the following drawings, in which:

FIG. 7 illustrates a graphics processor execution unit instruction format according to an embodiment;

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Graphics Processor Architectures and Data Types

System Overview

Figure 1:
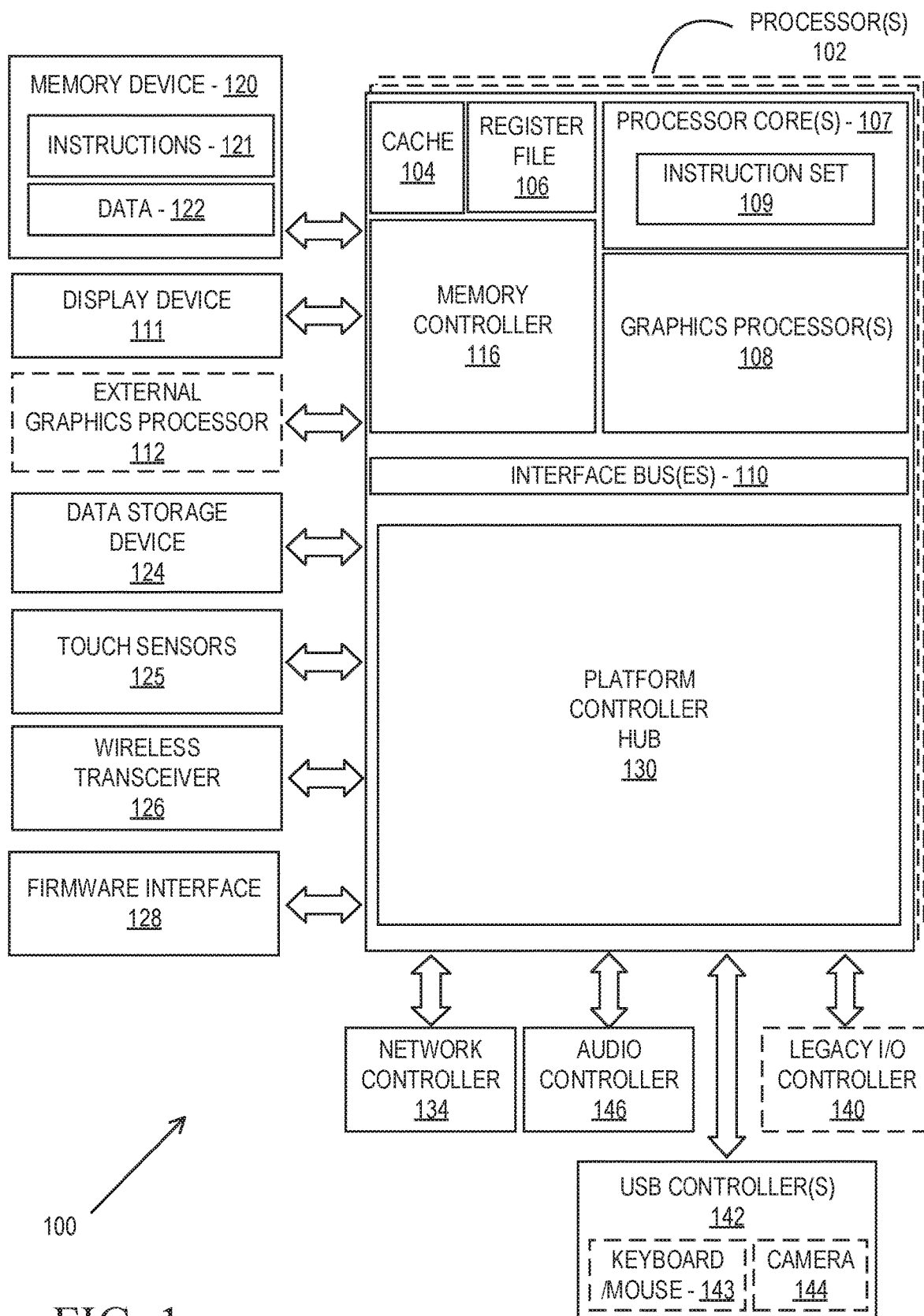
FIG. 1 is a block diagram of an embodiment of a computer system with a processor having one or more processor cores and graphics processors.

FIG. 1 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In one embodiment, the system 100 is a processing platform incorporated within a system-on-a-chip (SoC) integrated circuit for use in mobile, handheld, or embedded devices.

In one embodiment the system 100 can include, or be incorporated within a server-based gaming platform, a game console, including a game and media console, a mobile gaming console, a handheld game console, or an online game console. In some embodiments the system 100 is a mobile phone, smart phone, tablet computing device or mobile Internet device. The processing system 100 can also include, couple with, or be integrated within a wearable device, such as a smart watch wearable device, smart eyewear device, augmented reality device, or virtual reality device. In some embodiments, the processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, one or more processor(s) 102 are coupled with one or more interface bus(es) 110 to transmit communication signals such as address, data, or control signals between processor 102 and other components in the system 100. The interface bus 110, in one embodiment, can be a processor bus, such as a version of the Direct Media Interface (DMI) bus. However, processor busses are not limited to the DMI bus, and may include one or more Peripheral Component Interconnect buses (e.g., PCI, PCI Express), memory busses, or other types of interface busses. In one embodiment the processor(s) 102 include an integrated memory controller 116 and a platform controller hub 130. The memory controller 116 facilitates communication between a memory device and other components of the system 100, while the platform controller hub (PCH) 130 provides connections to I/O devices via a local I/O bus.

The memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller 116 also couples with an optional external graphics processor 112, which may communicate with the one or more graphics processors 108 in processors 102 to perform graphics and media operations. In some embodiments a display device 111 can connect to the processor(s) 102. The display device 111 can be one or more of an internal display device, as in a mobile electronic device or a laptop device or an external display device attached via a display interface (e.g., DisplayPort, etc.). In one embodiment the display device 111 can be a head mounted display (HMD) such as a stereoscopic display device for use in virtual reality (VR) applications or augmented reality (AR) applications.

In some embodiments the platform controller hub 130 enables peripherals to connect to memory device 120 and processor 102 via a high-speed I/O bus. The I/O peripherals include, but are not limited to, an audio controller 146, a network controller 134, a firmware interface 128, a wireless transceiver 126, touch sensors 125, a data storage device 124 (e.g., hard disk drive, flash memory, etc.). The data storage device 124 can connect via a storage interface (e.g., SATA) or via a peripheral bus, such as a Peripheral Component Interconnect bus (e.g., PCI, PCI Express). The touch sensors 125 can include touch screen sensors, pressure sensors, or fingerprint sensors. The wireless transceiver 126 can be a Wi-Fi transceiver, a Bluetooth transceiver, or a mobile network transceiver such as a 3G, 4G, or Long Term Evolution (LTE) transceiver. The firmware interface 128 enables communication with system firmware, and can be, for example, a unified extensible firmware interface (UEFI). The network controller 134 can enable a network connection to a wired network. In some embodiments, a high-performance network controller (not shown) couples with the interface bus 110. The audio controller 146, in one embodiment, is a multi-channel high definition audio controller. In one embodiment the system 100 includes an optional legacy I/O controller 140 for coupling legacy (e.g., Personal System 2 (PS/2)) devices to the system. The platform controller hub 130 can also connect to one or more Universal Serial Bus (USB) controllers 142 connect input devices, such as keyboard and mouse 143 combinations, a camera 144, or other USB input devices.

It will be appreciated that the system 100 shown is exemplary and not limiting, as other types of data processing systems that are differently configured may also be used. For example, an instance of the memory controller 116 and platform controller hub 130 may be integrated into a discreet external graphics processor, such as the external graphics processor 112. In one embodiment the platform controller hub 130 and/or memory controller 1160 may be external to the one or more processor(s) 102. For example, the system 100 can include an external memory controller 116 and platform controller hub 130, which may be configured as a memory controller hub and peripheral controller hub within a system chipset that is in communication with the processor(s) 102.

Figure 2:
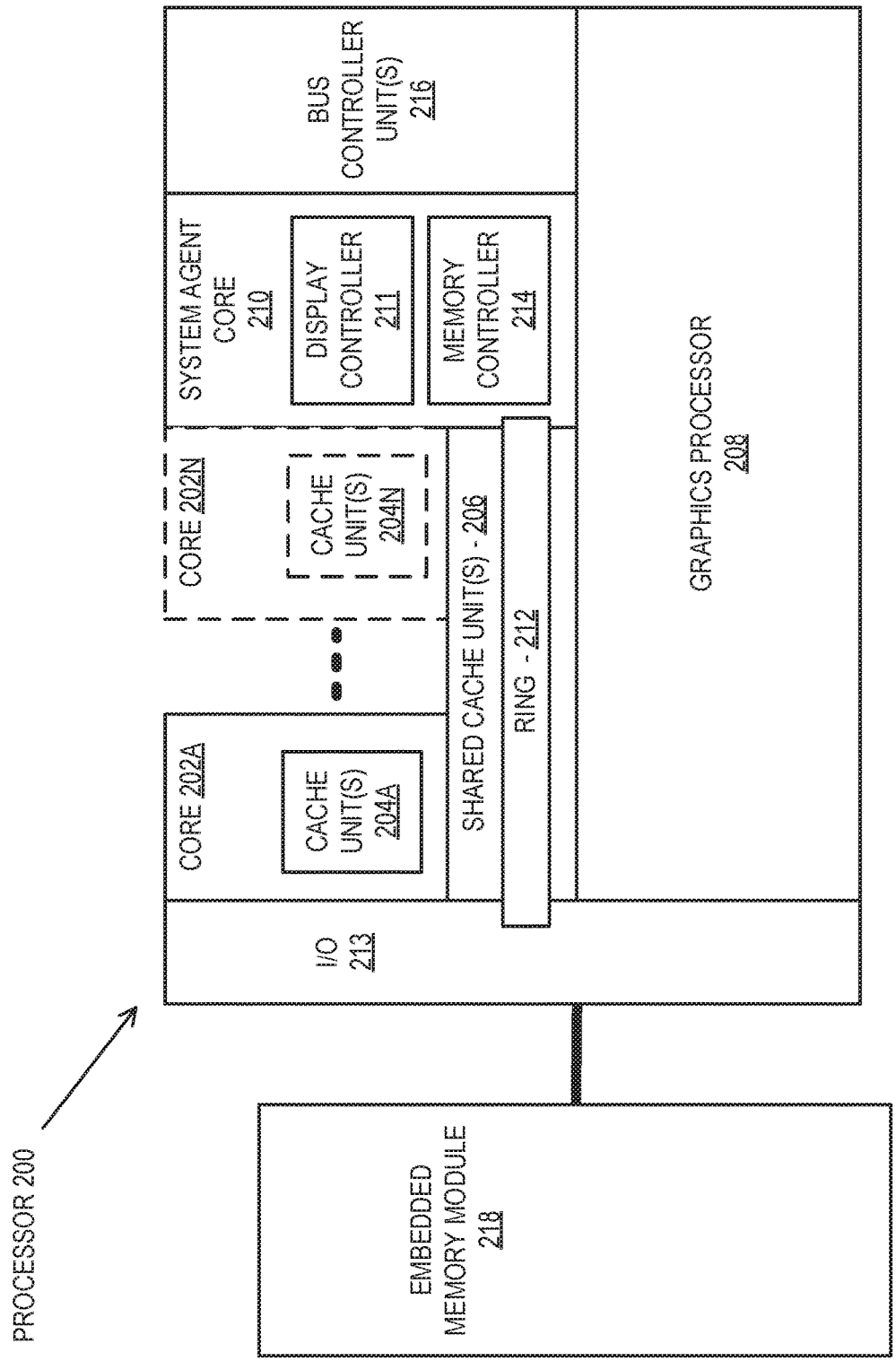
FIG. 2 is a block diagram of one embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more PCI or PCI express busses. System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, the system agent core 210 also includes a display controller 211 to drive graphics processor output to one or more coupled displays. In some embodiments, display controller 211 may also be a separate module coupled with the graphics processor via at least one interconnect, or may be integrated within the graphics processor 208.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202A-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-202N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
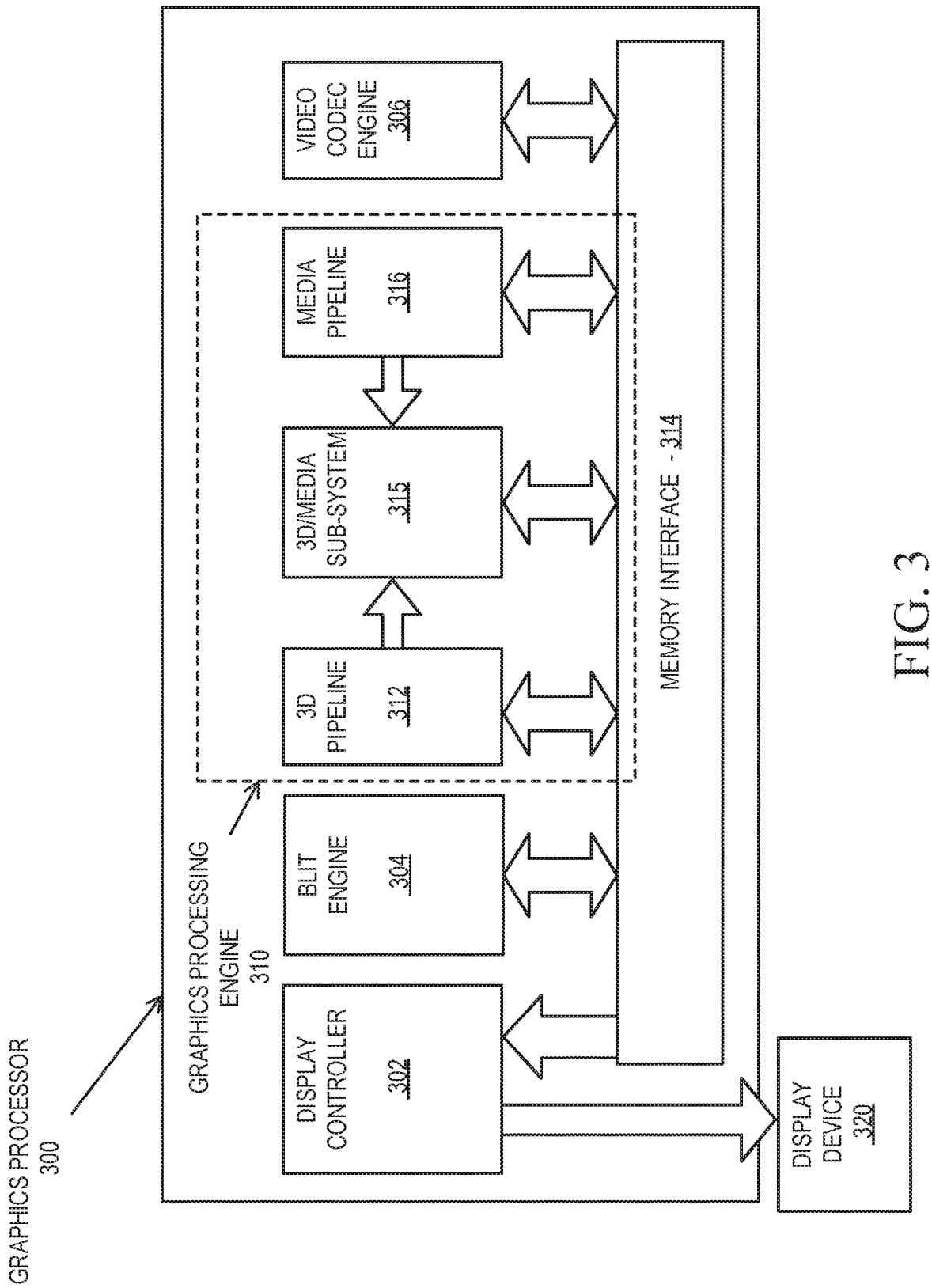
FIG. 3 is a block diagram of one embodiment of a graphics processor which may be a discreet graphics processing unit, or may be graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. The display device 320 can be an internal or external display device. In one embodiment the display device 320 is a head mounted display device, such as a virtual reality (VR) display device or an augmented reality (AR) display device. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, GPE 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media subsystem 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

Graphics Processing Engine

Figure 4:
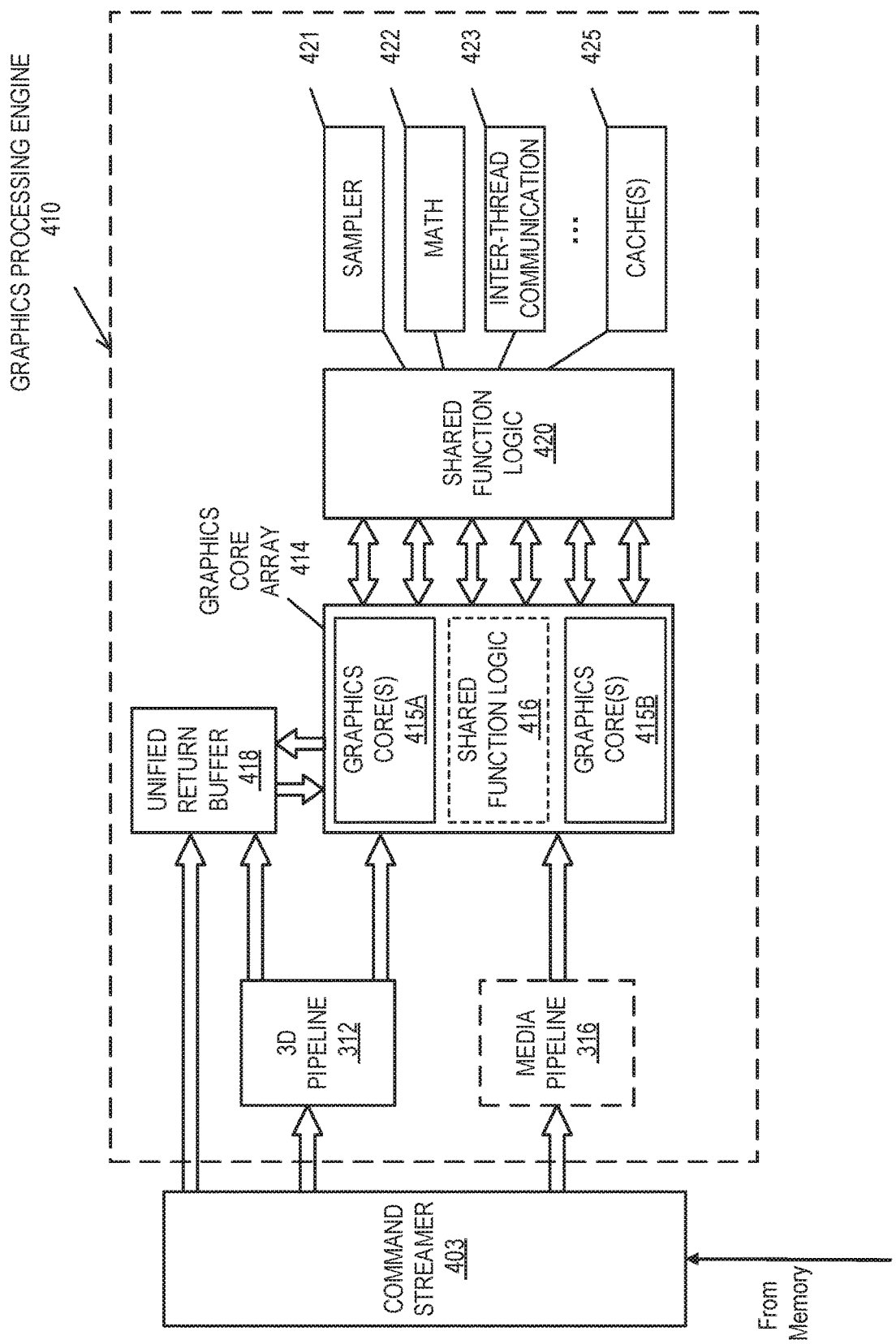
FIG. 4 is a block diagram of an embodiment of a graphics-processing engine for a graphics processor.

FIG. 4 is a block diagram of a graphics processing engine 410 of a graphics processor in accordance with some embodiments. In one embodiment, the graphics processing engine (GPE) 410 is a version of the GPE 310 shown in FIG. 3. Elements of FIG. 4 having the same reference numbers (or names) as the elements of any other figure herein can operate or function in any manner similar to that described elsewhere herein, but are not limited to such. For example, the 3D pipeline 312 and media pipeline 316 of FIG. 3 are illustrated. The media pipeline 316 is optional in some embodiments of the GPE 410 and may not be explicitly included within the GPE 410. For example and in at least one embodiment, a separate media and/or image processor is coupled to the GPE 410.

In some embodiments, GPE 410 couples with or includes a command streamer 403, which provides a command stream to the 3D pipeline 312 and/or media pipelines 316. In some embodiments, command streamer 403 is coupled with memory, which can be system memory, or one or more of internal cache memory and shared cache memory. In some embodiments, command streamer 403 receives commands from the memory and sends the commands to 3D pipeline 312 and/or media pipeline 316. The commands are directives fetched from a ring buffer, which stores commands for the 3D pipeline 312 and media pipeline 316. In one embodiment, the ring buffer can additionally include batch command buffers storing batches of multiple commands. The commands for the 3D pipeline 312 can also include references to data stored in memory, such as but not limited to vertex and geometry data for the 3D pipeline 312 and/or image data and memory objects for the media pipeline 316. The 3D pipeline 312 and media pipeline 316 process the commands and data by performing operations via logic within the respective pipelines or by dispatching one or more execution threads to a graphics core array 414. In one embodiment the graphics core array 414 include one or more blocks of graphics cores (e.g., graphics core(s) 415A, graphics core(s) 415B), each block including one or more graphics cores. Each graphics core includes a set of graphics execution resources that includes general-purpose and graphics specific execution logic to perform graphics and compute operations, as well as fixed function texture processing and/or machine learning and artificial intelligence acceleration logic.

In various embodiments the 3D pipeline 312 includes fixed function and programmable logic to process one or more shader programs, such as vertex shaders, geometry shaders, pixel shaders, fragment shaders, compute shaders, or other shader programs, by processing the instructions and dispatching execution threads to the graphics core array 414. The graphics core array 414 provides a unified block of execution resources for use in processing these shader programs. Multi-purpose execution logic (e.g., execution units) within the graphics core(s) 415A-414B of the graphic core array 414 includes support for various 3D API shader languages and can execute multiple simultaneous execution threads associated with multiple shaders.

In some embodiments the graphics core array 414 also includes execution logic to perform media functions, such as video and/or image processing. In one embodiment, the execution units additionally include general-purpose logic that is programmable to perform parallel general-purpose computational operations, in addition to graphics processing operations. The general-purpose logic can perform processing operations in parallel or in conjunction with general-purpose logic within the processor core(s) 107 of FIG. 1 or core 202A-202N as in FIG. 2.

Output data generated by threads executing on the graphics core array 414 can output data to memory in a unified return buffer (URB) 418. The URB 418 can store data for multiple threads. In some embodiments the URB 418 may be used to send data between different threads executing on the graphics core array 414. In some embodiments the URB 418 may additionally be used for synchronization between threads on the graphics core array and fixed function logic within the shared function logic 420.

In some embodiments, graphics core array 414 is scalable, such that the array includes a variable number of graphics cores, each having a variable number of execution units based on the target power and performance level of GPE 410. In one embodiment the execution resources are dynamically scalable, such that execution resources may be enabled or disabled as needed.

The graphics core array 414 couples with shared function logic 420 that includes multiple resources that are shared between the graphics cores in the graphics core array. The shared functions within the shared function logic 420 are hardware logic units that provide specialized supplemental functionality to the graphics core array 414. In various embodiments, shared function logic 420 includes but is not limited to sampler 421, math 422, and inter-thread communication (ITC) 423 logic. Additionally, some embodiments implement one or more cache(s) 425 within the shared function logic 420.

A shared function is implemented where the demand for a given specialized function is insufficient for inclusion within the graphics core array 414. Instead a single instantiation of that specialized function is implemented as a stand-alone entity in the shared function logic 420 and shared among the execution resources within the graphics core array 414. The precise set of functions that are shared between the graphics core array 414 and included within the graphics core array 414 varies across embodiments. In some embodiments, specific shared functions within the shared function logic 420 that are used extensively by the graphics core array 414 may be included within shared function logic 416 within the graphics core array 414. In various embodiments, the shared function logic 416 within the graphics core array 414 can include some or all logic within the shared function logic 420. In one embodiment, all logic elements within the shared function logic 420 may be duplicated within the shared function logic 416 of the graphics core array 414. In one embodiment the shared function logic 420 is excluded in favor of the shared function logic 416 within the graphics core array 414.

Figure 5:
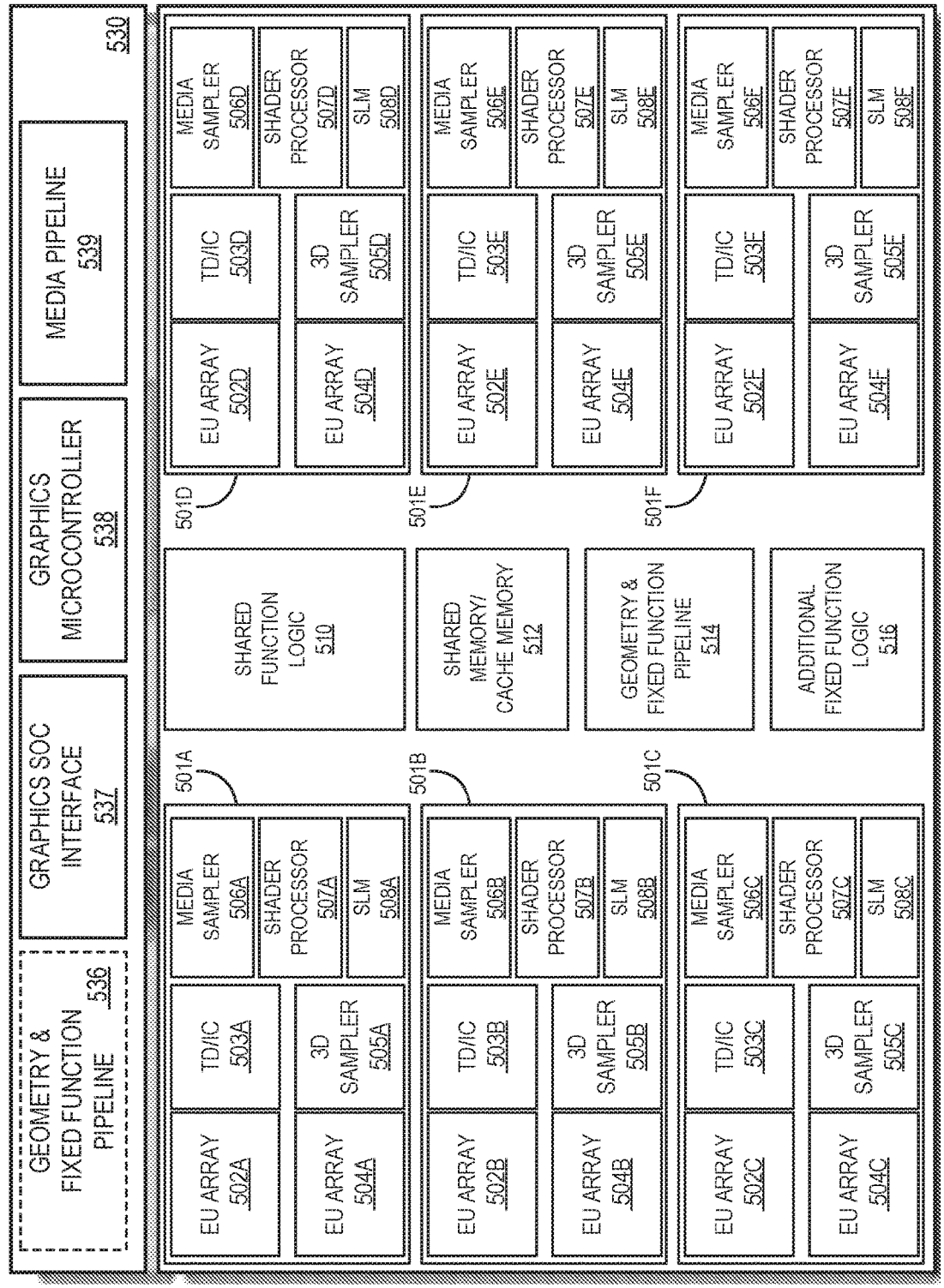
FIG. 5 is a block diagram of another embodiment of a graphics processor.

FIG. 5 is a block diagram of hardware logic of a graphics processor core 500, according to some embodiments described herein. Elements of FIG. 5 having the same reference numbers (or names) as the elements of any other figure herein can operate or function in any manner similar to that described elsewhere herein, but are not limited to such. The illustrated graphics processor core 500, in some embodiments, is included within the graphics core array 414 of FIG. 4. The graphics processor core 500, sometimes referred to as a core slice, can be one or multiple graphics cores within a modular graphics processor. The graphics processor core 500 is exemplary of one graphics core slice, and a graphics processor as described herein may include multiple graphics core slices based on target power and performance envelopes. Each graphics processor core 500 can include a fixed function block 530 coupled with multiple sub-cores 501A-501F, also referred to as sub-slices, that include modular blocks of general-purpose and fixed function logic.

In some embodiments the fixed function block 530 includes a geometry/fixed function pipeline 536 that can be shared by all sub-cores in the graphics processor core 500, for example, in lower performance and/or lower power graphics processor implementations. In various embodiments, the geometry/fixed function pipeline 536 includes a 3D fixed function pipeline (e.g., 3D pipeline 312 as in FIG. 3 and FIG. 4) a video front-end unit, a thread spawner and thread dispatcher, and a unified return buffer manager, which manages unified return buffers, such as the unified return buffer 418 of FIG. 4.

In one embodiment the fixed function block 530 also includes a graphics SoC interface 537, a graphics microcontroller 538, and a media pipeline 539. The graphics SoC interface 537 provides an interface between the graphics processor core 500 and other processor cores within a system on a chip integrated circuit. The graphics microcontroller 538 is a programmable sub-processor that is configurable to manage various functions of the graphics processor core 500, including thread dispatch, scheduling, and pre-emption. The media pipeline 539 (e.g., media pipeline 316 of FIG. 3 and FIG. 4) includes logic to facilitate the decoding, encoding, pre-processing, and/or post-processing of multimedia data, including image and video data. The media pipeline 539 implement media operations via requests to compute or sampling logic within the sub-cores 501-501F.

In one embodiment the SoC interface 537 enables the graphics processor core 500 to communicate with general-purpose application processor cores (e.g., CPUs) and/or other components within an SoC, including memory hierarchy elements such as a shared last level cache memory, the system RAM, and/or embedded on-chip or on-package DRAM. The SoC interface 537 can also enable communication with fixed function devices within the SoC, such as camera imaging pipelines, and enables the use of and/or implements global memory atomics that may be shared between the graphics processor core 500 and CPUs within the SoC. The SoC interface 537 can also implement power management controls for the graphics processor core 500 and enable an interface between a clock domain of the graphic core 500 and other clock domains within the SoC. In one embodiment the SoC interface 537 enables receipt of command buffers from a command streamer and global thread dispatcher that are configured to provide commands and instructions to each of one or more graphics cores within a graphics processor. The commands and instructions can be dispatched to the media pipeline 539, when media operations are to be performed, or a geometry and fixed function pipeline (e.g., geometry and fixed function pipeline 536, geometry and fixed function pipeline 514) when graphics processing operations are to be performed.

The graphics microcontroller 538 can be configured to perform various scheduling and management tasks for the graphics processor core 500. In one embodiment the graphics microcontroller 538 can perform graphics and/or compute workload scheduling on the various graphics parallel engines within execution unit (EU) arrays 502A-502F, 504A-504F within the sub-cores 501A-501F. In this scheduling model, host software executing on a CPU core of an SoC including the graphics processor core 500 can submit workloads one of multiple graphic processor doorbells, which invokes a scheduling operation on the appropriate graphics engine. Scheduling operations include determining which workload to run next, submitting a workload to a command streamer, pre-empting existing workloads running on an engine, monitoring progress of a workload, and notifying host software when a workload is complete. In one embodiment the graphics microcontroller 538 can also facilitate low-power or idle states for the graphics processor core 500, providing the graphics processor core 500 with the ability to save and restore registers within the graphics processor core 500 across low-power state transitions independently from the operating system and/or graphics driver software on the system.

The graphics processor core 500 may have greater than or fewer than the illustrated sub-cores 501A-501F, up to N modular sub-cores. For each set of N sub-cores, the graphics processor core 500 can also include shared function logic 510, shared and/or cache memory 512, a geometry/fixed function pipeline 514, as well as additional fixed function logic 516 to accelerate various graphics and compute processing operations. The shared function logic 510 can include logic units associated with the shared function logic 420 of FIG. 4 (e.g., sampler, math, and/or inter-thread communication logic) that can be shared by each N sub-cores within the graphics processor core 500. The shared and/or cache memory 512 can be a last-level cache for the set of N sub-cores 501A-501F within the graphics processor core 500, and can also serve as shared memory that is accessible by multiple sub-cores. The geometry/fixed function pipeline 514 can be included instead of the geometry/fixed function pipeline 536 within the fixed function block 530 and can include the same or similar logic units.

In one embodiment the graphics processor core 500 includes additional fixed function logic 516 that can include various fixed function acceleration logic for use by the graphics processor core 500. In one embodiment the additional fixed function logic 516 includes an additional geometry pipeline for use in position only shading. In position-only shading, two geometry pipelines exist, the full geometry pipeline within the geometry/fixed function pipeline 516, 536, and a cull pipeline, which is an additional geometry pipeline which may be included within the additional fixed function logic 516. In one embodiment the cull pipeline is a trimmed down version of the full geometry pipeline. The full pipeline and the cull pipeline can execute different instances of the same application, each instance having a separate context. Position only shading can hide long cull runs of discarded triangles, enabling shading to be completed earlier in some instances. For example and in one embodiment the cull pipeline logic within the additional fixed function logic 516 can execute position shaders in parallel with the main application and generally generates critical results faster than the full pipeline, as the cull pipeline fetches and shades only the position attribute of the vertices, without performing rasterization and rendering of the pixels to the frame buffer. The cull pipeline can use the generated critical results to compute visibility information for all the triangles without regard to whether those triangles are culled. The full pipeline (which in this instance may be referred to as a replay pipeline) can consume the visibility information to skip the culled triangles to shade only the visible triangles that are finally passed to the rasterization phase.

In one embodiment the additional fixed function logic 516 can also include machine-learning acceleration logic, such as fixed function matrix multiplication logic, for implementations including optimizations for machine learning training or inferencing.

Within each graphics sub-core 501A-501F includes a set of execution resources that may be used to perform graphics, media, and compute operations in response to requests by graphics pipeline, media pipeline, or shader programs. The graphics sub-cores 501A-501F include multiple EU arrays 502A-502F, 504A-504F, thread dispatch and inter-thread communication (TD/IC) logic 503A-503F, a 3D (e.g., texture) sampler 505A-505F, a media sampler 506A-506F, a shader processor 507A-507F, and shared local memory (SLM) 508A-508F. The EU arrays 502A-502F, 504A-504F each include multiple execution units, which are general-purpose graphics processing units capable of performing floating-point and integer/fixed-point logic operations in service of a graphics, media, or compute operation, including graphics, media, or compute shader programs. The TD/IC logic 503A-503F performs local thread dispatch and thread control operations for the execution units within a sub-core and facilitate communication between threads executing on the execution units of the sub-core. The 3D sampler 505A-505F can read texture or other 3D graphics related data into memory. The 3D sampler can read texture data differently based on a configured sample state and the texture format associated with a given texture. The media sampler 506A-506F can perform similar read operations based on the type and format associated with media data. In one embodiment, each graphics sub-core 501A-501F can alternately include a unified 3D and media sampler. Threads executing on the execution units within each of the sub-cores 501A-501F can make use of shared local memory 508A-508F within each sub-core, to enable threads executing within a thread group to execute using a common pool of on-chip memory.

Execution Units

Figure 6A:
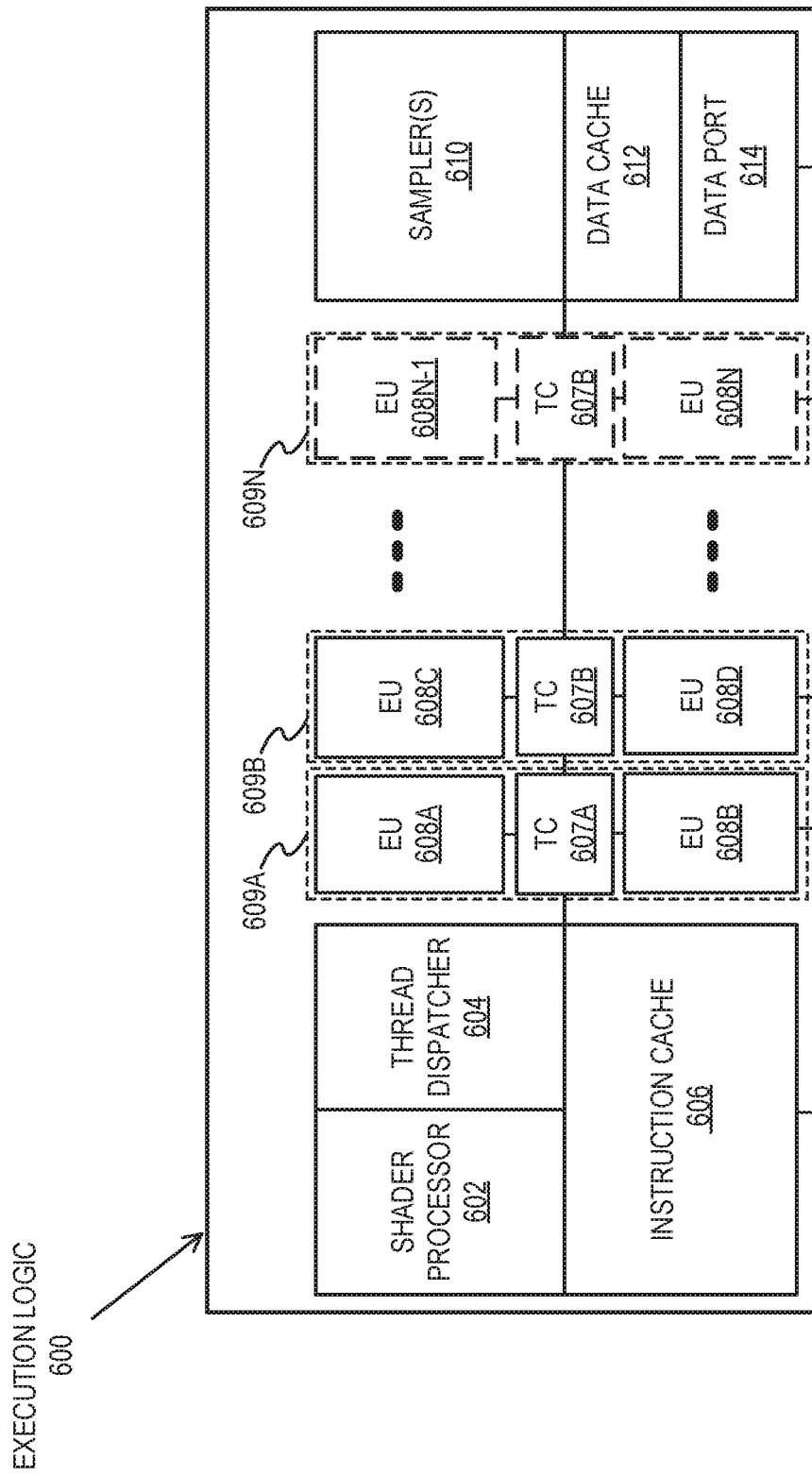
FIGS. 6A-B is a block diagram of thread execution logic including an array of processing elements.
Figure 6B:
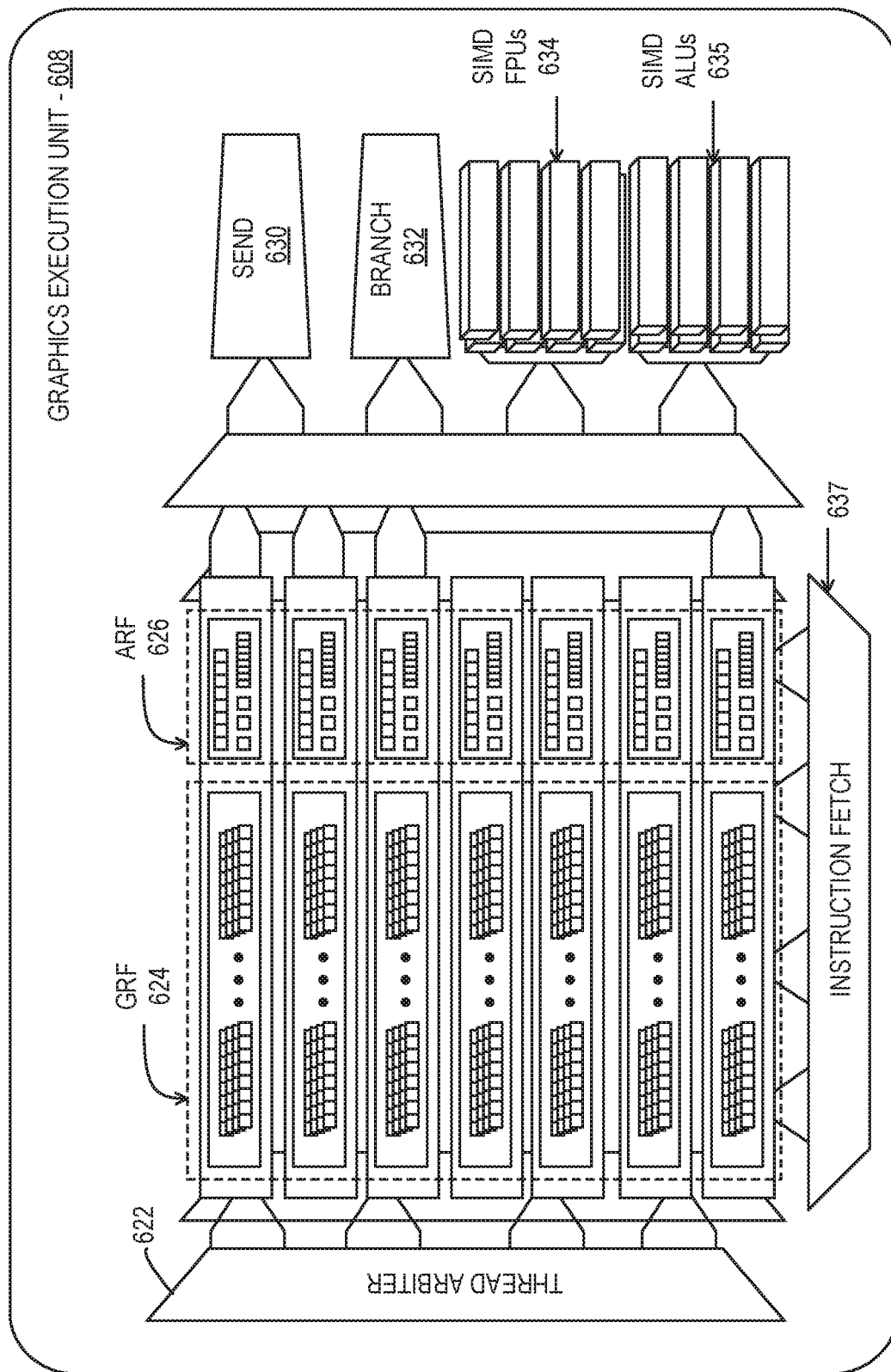

FIGS. 6A-6B illustrate thread execution logic 600 including an array of processing elements employed in a graphics processor core according to embodiments described herein. Elements of FIGS. 6A-6B having the same reference numbers (or names) as the elements of any other figure herein can operate or function in any manner similar to that described elsewhere herein, but are not limited to such. FIG. 6A illustrates an overview of thread execution logic 600, which can include a variant of the hardware logic illustrated with each sub-core 501A-501F of FIG. 5. FIG. 6B illustrates exemplary internal details of an execution unit.

As illustrated in FIG. 6A, in some embodiments thread execution logic 600 includes a shader processor 602, a thread dispatcher 604, instruction cache 606, a scalable execution unit array including a plurality of execution units 608A-608N, a sampler 610, a data cache 612, and a data port 614. In one embodiment the scalable execution unit array can dynamically scale by enabling or disabling one or more execution units (e.g., any of execution unit 608A, 608B, 608C, 608D, through 608N-1 and 608N) based on the computational requirements of a workload. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution units 608A-608N. In some embodiments, each execution unit (e.g. 608A) is a stand-alone programmable general-purpose computational unit that is capable of executing multiple simultaneous hardware threads while processing multiple data elements in parallel for each thread. In various embodiments, the array of execution units 608A-608N is scalable to include any number individual execution units.

In some embodiments, the execution units 608A-608N are primarily used to execute shader programs. A shader processor 602 can process the various shader programs and dispatch execution threads associated with the shader programs via a thread dispatcher 604. In one embodiment the thread dispatcher includes logic to arbitrate thread initiation requests from the graphics and media pipelines and instantiate the requested threads on one or more execution unit in the execution units 608A-608N. For example, a geometry pipeline can dispatch vertex, tessellation, or geometry shaders to the thread execution logic for processing. In some embodiments, thread dispatcher 604 can also process runtime thread spawning requests from the executing shader programs.

In some embodiments, the execution units 608A-608N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 608A-608N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the execution units 608A-608N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader.

Each execution unit in execution units 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW)

size data elements), sixteen separate 16-bit packed data elements (Word (W) size data elements), or thirty-two separate 8-bit data elements (byte (B) size data elements). However, different vector widths and register sizes are possible.

In one embodiment one or more execution units can be combined into a fused execution unit 609A-609N having thread control logic (607A-607N) that is common to the fused EUs. Multiple EUs can be fused into an EU group. Each EU in the fused EU group can be configured to execute a separate SIMD hardware thread. The number of EUs in a fused EU group can vary according to embodiments. Additionally, various SIMD widths can be performed per-EU, including but not limited to SIMD8, SIMD16, and SIMD32. Each fused graphics execution unit 609A-609N includes at least two execution units. For example, fused execution unit 609A includes a first EU 608A, second EU 608B, and thread control logic 607A that is common to the first EU 608A and the second EU 608B. The thread control logic 607A controls threads executed on the fused graphics execution unit 609A, allowing each EU within the fused execution units 609A-609N to execute using a common instruction pointer register.

One or more internal instruction caches (e.g., 606) are included in the thread execution logic 600 to cache thread instructions for the execution units. In some embodiments, one or more data caches (e.g., 612) are included to cache thread data during thread execution. In some embodiments, a sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. Once a group of geometric objects has been processed and rasterized into pixel data, pixel processor logic (e.g., pixel shader logic, fragment shader logic, etc.) within the shader processor 602 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 602 then executes an application programming interface (API)-supplied pixel or fragment shader program. To execute the shader program, the shader processor 602 dispatches threads to an execution unit (e.g., 608A) via thread dispatcher 604. In some embodiments, shader processor 602 uses texture sampling logic in the sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 to output processed data to memory for further processing on a graphics processor output pipeline. In some embodiments, the data port 614 includes or couples to one or more cache memories (e.g., data cache 612) to cache data for memory access via the data port.

As illustrated in FIG. 6B, a graphics execution unit 608 can include an instruction fetch unit 637, a general register file array (GRF) 624, an architectural register file array (ARF) 626, a thread arbiter 622, a send unit 630, a branch unit 632, a set of SIMD floating point units (FPUs) 634, and in one embodiment a set of dedicated integer SIMD ALUs 635. The GRF 624 and ARF 626 includes the set of general register files and architecture register files associated with each simultaneous hardware thread that may be active in the graphics execution unit 608. In one embodiment, per thread architectural state is maintained in the ARF 626, while data used during thread execution is stored in the GRF 624. The execution state of each thread, including the instruction pointers for each thread, can be held in thread-specific registers in the ARF 626.

In one embodiment the graphics execution unit 608 has an architecture that is a combination of Simultaneous Multi-Threading (SMT) and fine-grained Interleaved Multi-Threading (IMT). The architecture has a modular configuration that can be fine tuned at design time based on a target number of simultaneous threads and number of registers per execution unit, where execution unit resources are divided across logic used to execute multiple simultaneous threads.

In one embodiment, the graphics execution unit 608 can co-issue multiple instructions, which may each be different instructions. The thread arbiter 622 of the graphics execution unit thread 608 can dispatch the instructions to one of the send unit 630, branch unit 6342, or SIMD FPU(s) 634 for execution. Each execution thread can access 128 general-purpose registers within the GRF 624, where each register can store 32 bytes, accessible as a SIMD 8-element vector of 32-bit data elements. In one embodiment, each execution unit thread has access to 4 Kbytes within the GRF 624, although embodiments are not so limited, and greater or fewer register resources may be provided in other embodiments. In one embodiment up to seven threads can execute simultaneously, although the number of threads per execution unit can also vary according to embodiments. In an embodiment in which seven threads may access 4 Kbytes, the GRF 624 can store a total of 28 Kbytes. Flexible addressing modes can permit registers to be addressed together to build effectively wider registers or to represent strided rectangular block data structures.

In one embodiment, memory operations, sampler operations, and other longer-latency system communications are dispatched via "send" instructions that are executed by the message passing send unit 630. In one embodiment, branch instructions are dispatched to a dedicated branch unit 632 to facilitate SIMD divergence and eventual convergence.

In one embodiment the graphics execution unit 608 includes one or more SIMD floating point units (FPU(s)) 634 to perform floating-point operations. In one embodiment, the FPU(s) 634 also support integer computation. In one embodiment the FPU(s) 634 can SIMD execute up to M number of 32-bit floating-point (or integer) operations, or SIMD execute up to 2M 16-bit integer or 16-bit floating-point operations. In one embodiment, at least one of the FPU(s) provides extended math capability to support high-throughput transcendental math functions and double precision 64-bit floating-point. In some embodiments, a set of 8-bit integer SIMD ALUs 635 are also present, and may be specifically optimized to perform operations associated with machine learning computations.

In one embodiment, arrays of multiple instances of the graphics execution unit 608 can be instantiated in a graphics sub-core grouping (e.g., a sub-slice). For scalability, product architects can chose the exact number of execution units per sub-core grouping. In one embodiment the execution unit 608 can execute instructions across a plurality of execution channels. In a further embodiment, each thread executed on the graphics execution unit 608 is executed on a different channel.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 710. A 64-bit compacted instruction format 730 is available for some instructions based on the selected instruction, instruction options, and number of operands. The native 128-bit instruction format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit instruction format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For instructions in the 128-bit instruction format 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode field 726 specifying, for example, whether direct register addressing mode or indirect register addressing mode is used. When direct register addressing mode is used, the register address of one or more operands is directly provided by bits in the instruction.

In some embodiments, the 128-bit instruction format 710 includes an access/address mode field 726, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 726 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
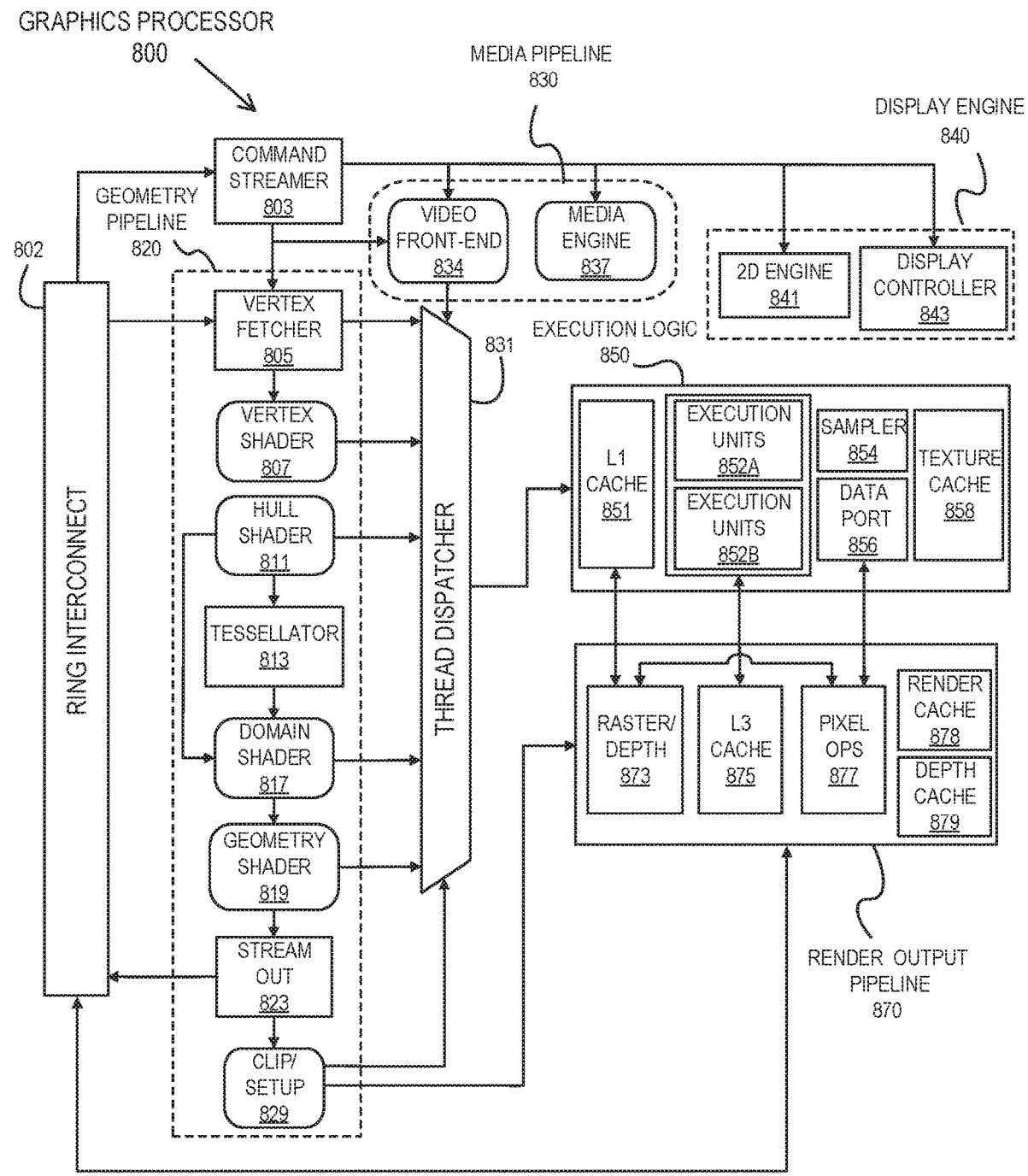
FIG. 8 is a block diagram of another embodiment of a graphics processor which includes a graphics pipeline, a media pipeline, a display engine, thread execution logic, and a render output pipeline.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a geometry pipeline 820, a media pipeline 830, a display engine 840, thread execution logic 850, and a render output pipeline 870. In some embodiments, graphics processor 800 is a graphics processor within a multi-core processing system that includes one or more general-purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of the geometry pipeline 820 or the media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A-852B via a thread dispatcher 831.

In some embodiments, execution units 852A-852B are an array of vector processors having an instruction set for performing graphics and media operations. In some embodiments, execution units 852A-852B have an attached L1 cache 851 that is specific for each array or shared between the arrays. The cache can be configured as a data cache, an instruction cache, or a single cache that is partitioned to contain data and instructions in different partitions.

In some embodiments, geometry pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to geometry pipeline 820. In some embodiments, if tessellation is not used, tessellation components (e.g., hull shader 811, tessellator 813, and domain shader 817) can be bypassed.

In some embodiments, complete geometric objects can be processed by a geometry shader 819 via one or more threads dispatched to execution units 852A-852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into per pixel representations. In some embodiments, pixel shader logic is included in thread execution logic 850. In some embodiments, an application can bypass the rasterizer and depth test component 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A-852B and associated logic units (e.g., L1 cache 851, sampler 854, texture cache 858, etc.) interconnect via a data port 856 to perform memory access and communicate with render output pipeline components of the processor. In some embodiments, sampler 854, caches 851, 858 and execution units 852A-852B each have separate memory access paths. In one embodiment the texture cache 858 can also be configured as a sampler cache.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front-end 834. In some embodiments, video front-end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, the geometry pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

Figure 9:
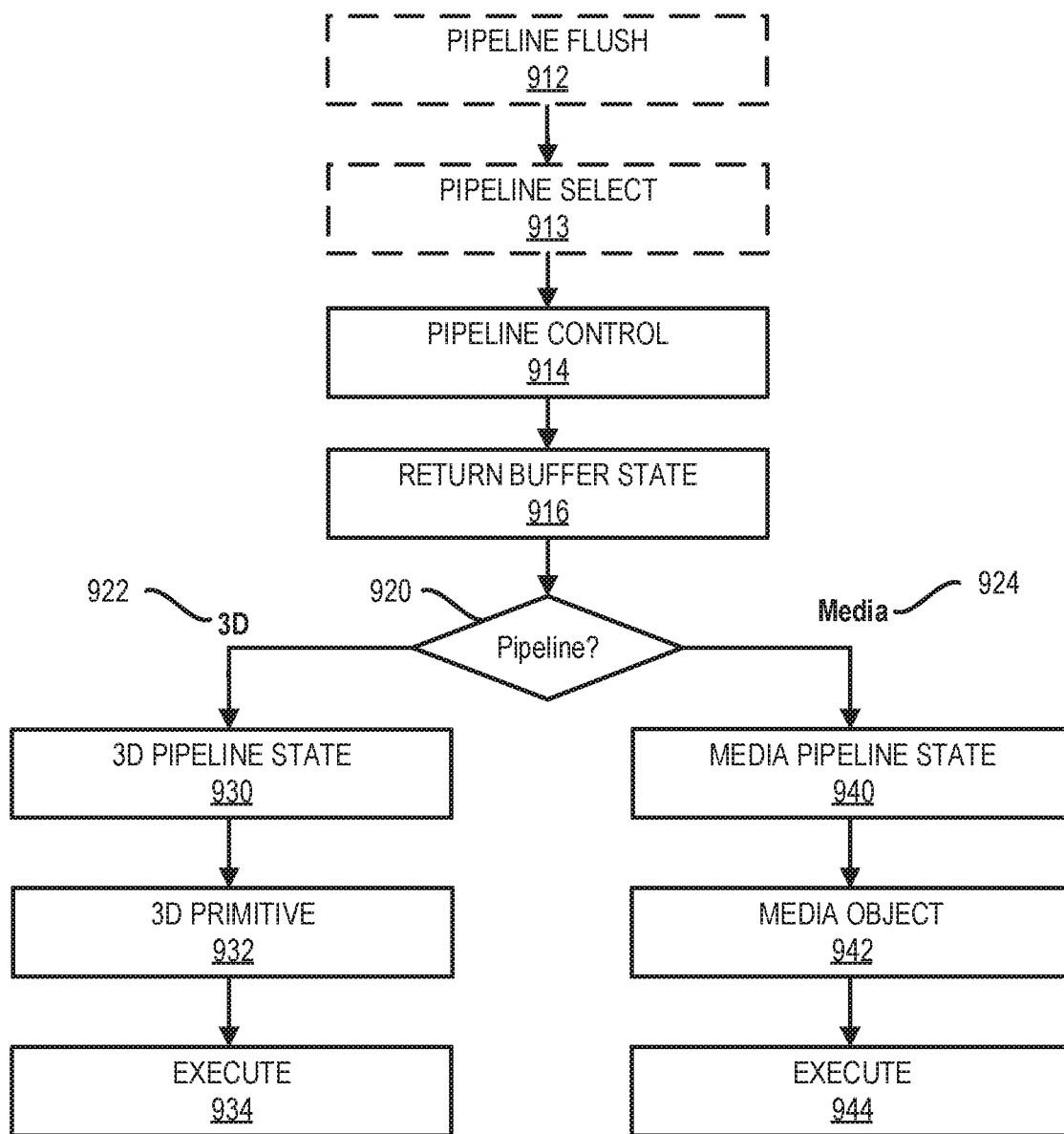
FIG. 9A is a block diagram illustrating a graphics processor command format according to an embodiment.
FIG. 9B is a block diagram illustrating a graphics processor command sequence according to an embodiment.

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a client 902, a command operation code (opcode) 904, and data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B illustrates an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930 or the media pipeline 924 beginning at the media pipeline state 940.

The commands to configure the 3D pipeline state 930 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general-purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of commands to configure the media pipeline state 940 are dispatched or placed into a command queue before the media object commands 942. In some embodiments, commands for the media pipeline state 940 include data to configure the media pipeline elements that will be used to process the media objects. This includes data to configure the video decode and video encode logic within the media pipeline, such as encode or decode format. In some embodiments, commands for the media pipeline state 940 also support the use of one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
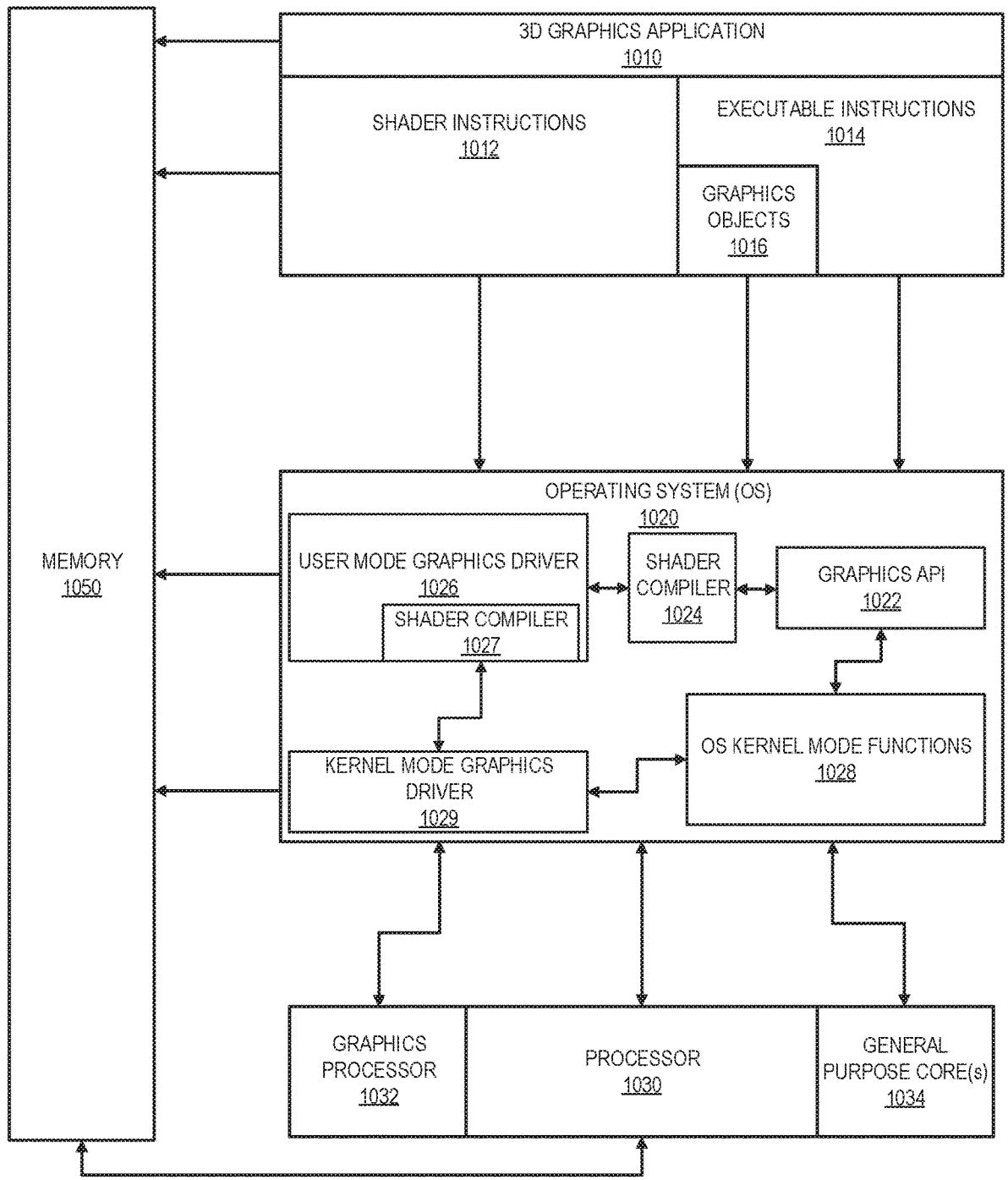
FIG. 10 illustrates exemplary graphics software architecture for a data processing system according to an embodiment.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API, the OpenGL API, or the Vulkan API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010. In some embodiments, the shader instructions 1012 are provided in an intermediate form, such as a version of the Standard Portable Intermediate Representation (SPIR) used by the Vulkan API.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11A:
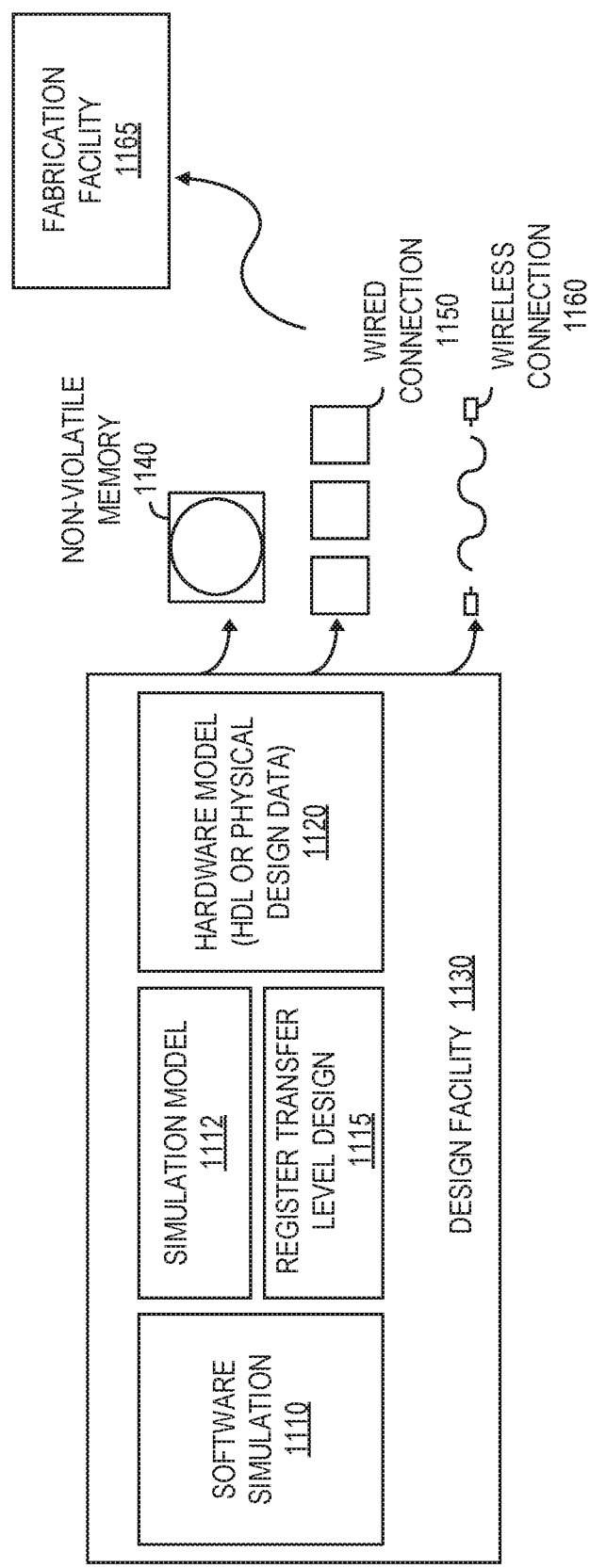
FIGS. 11A-B illustrates an exemplary IP core development system that may be used to manufacture an integrated circuit to perform operations according to an embodiment.

FIG. 11A is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high-level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design 1115 can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a 3rd party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 11B:
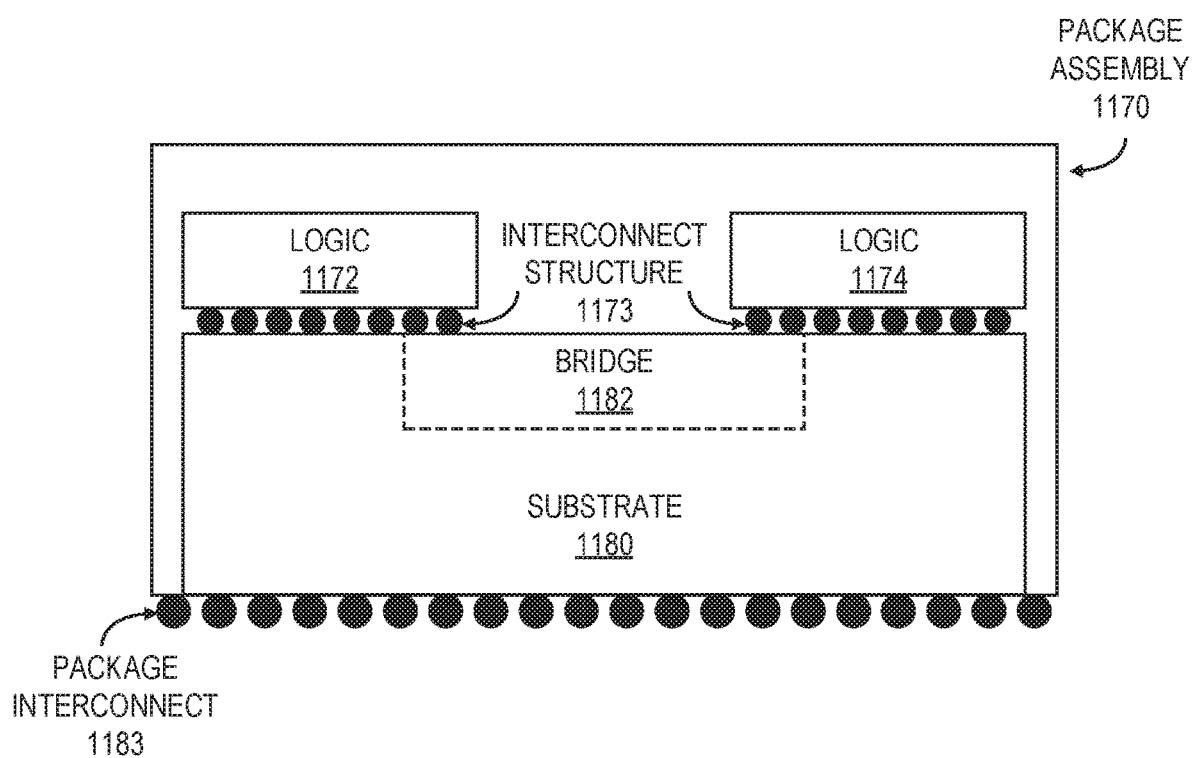

FIG. 11B illustrates a cross-section side view of an integrated circuit package assembly 1170, according to some embodiments described herein. The integrated circuit package assembly 1170 illustrates an implementation of one or more processor or accelerator devices as described herein. The package assembly 1170 includes multiple units of hardware logic 1172, 1174 connected to a substrate 1180. The logic 1172, 1174 may be implemented at least partly in configurable logic or fixed-functionality logic hardware, and can include one or more portions of any of the processor core(s), graphics processor(s), or other accelerator devices described herein. Each unit of logic 1172, 1174 can be implemented within a semiconductor die and coupled with the substrate 1180 via an interconnect structure 1173. The interconnect structure 1173 may be configured to route electrical signals between the logic 1172, 1174 and the substrate 1180, and can include interconnects such as, but not limited to bumps or pillars. In some embodiments, the interconnect structure 1173 may be configured to route electrical signals such as, for example, input/output (I/O) signals and/or power or ground signals associated with the operation of the logic 1172, 1174. In some embodiments, the substrate 1180 is an epoxy-based laminate substrate. The package substrate 1180 may include other suitable types of substrates in other embodiments. The package assembly 1170 can be connected to other electrical devices via a package interconnect 1183. The package interconnect 1183 may be coupled to a surface of the substrate 1180 to route electrical signals to other electrical devices, such as a motherboard, other chipset, or multi-chip module.

In some embodiments, the units of logic 1172, 1174 are electrically coupled with a bridge 1182 that is configured to route electrical signals between the logic 1172, 1174. The bridge 1182 may be a dense interconnect structure that provides a route for electrical signals. The bridge 1182 may include a bridge substrate composed of glass or a suitable semiconductor material. Electrical routing features can be formed on the bridge substrate to provide a chip-to-chip connection between the logic 1172, 1174.

Although two units of logic 1172, 1174 and a bridge 1182 are illustrated, embodiments described herein may include more or fewer logic units on one or more dies. The one or more dies may be connected by zero or more bridges, as the bridge 1182 may be excluded when the logic is included on a single die. Alternatively, multiple dies or units of logic can be connected by one or more bridges. Additionally, multiple logic units, dies, and bridges can be connected together in other possible configurations, including three-dimensional configurations.

Exemplary System on a Chip Integrated Circuit

Figure 12:
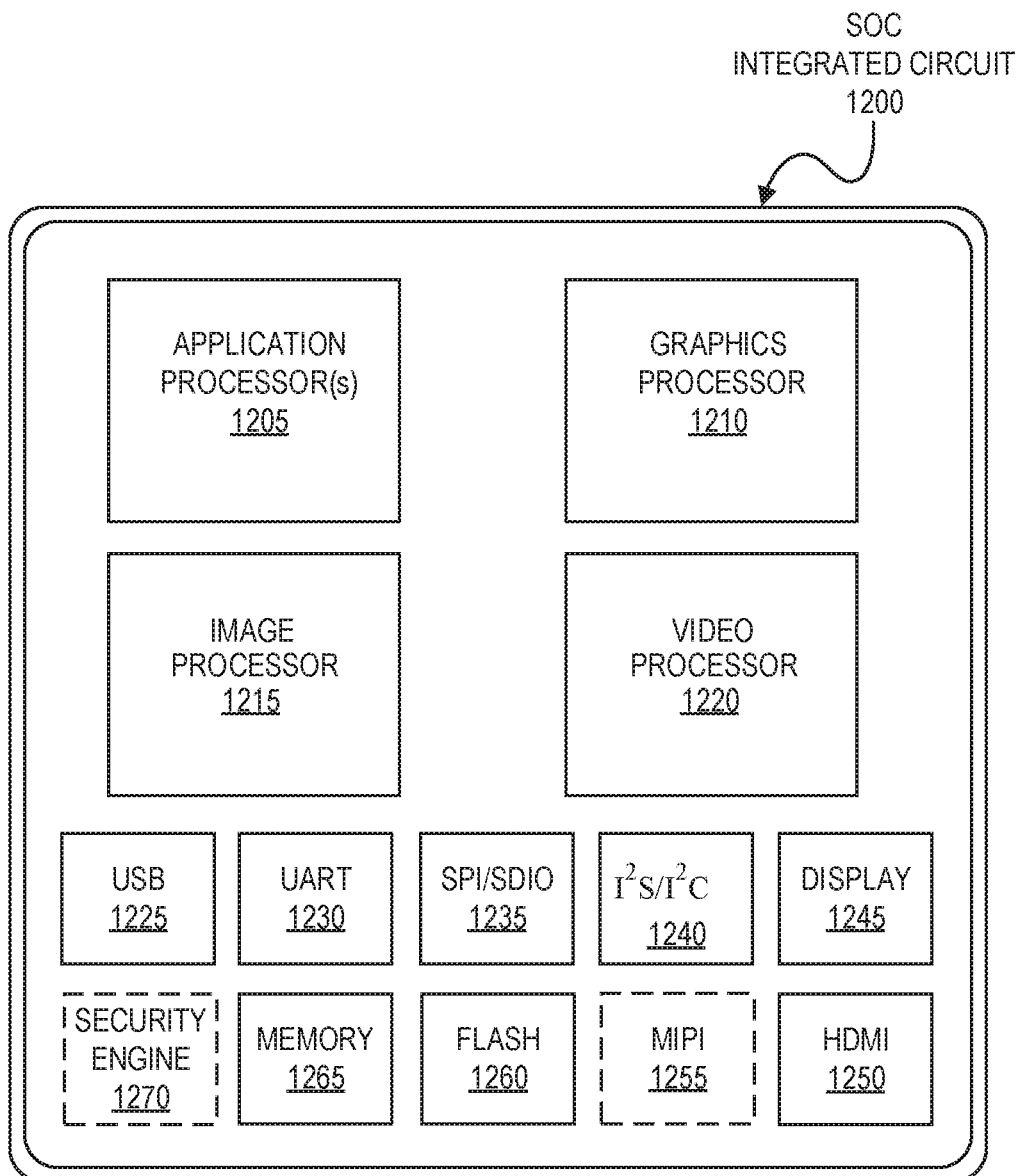
FIG. 12 illustrates an exemplary system on a chip integrated circuit that may be fabricated using one or more IP cores, according to an embodiment.

FIGS. 12-14 illustrated exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general-purpose processor cores.

FIG. 12 is a block diagram illustrating an exemplary system on a chip integrated circuit 1200 that may be fabricated using one or more IP cores, according to an embodiment. Exemplary integrated circuit 1200 includes one or more application processor(s) 1205 (e.g., CPUs), at least one graphics processor 1210, and may additionally include an image processor 1215 and/or a video processor 1220, any of which may be a modular IP core from the same or multiple different design facilities. Integrated circuit 1200 includes peripheral or bus logic including a USB controller 1225, UART controller 1230, an SPI/SDIO controller 1235, and an I2S/I2C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

Figure 13A:
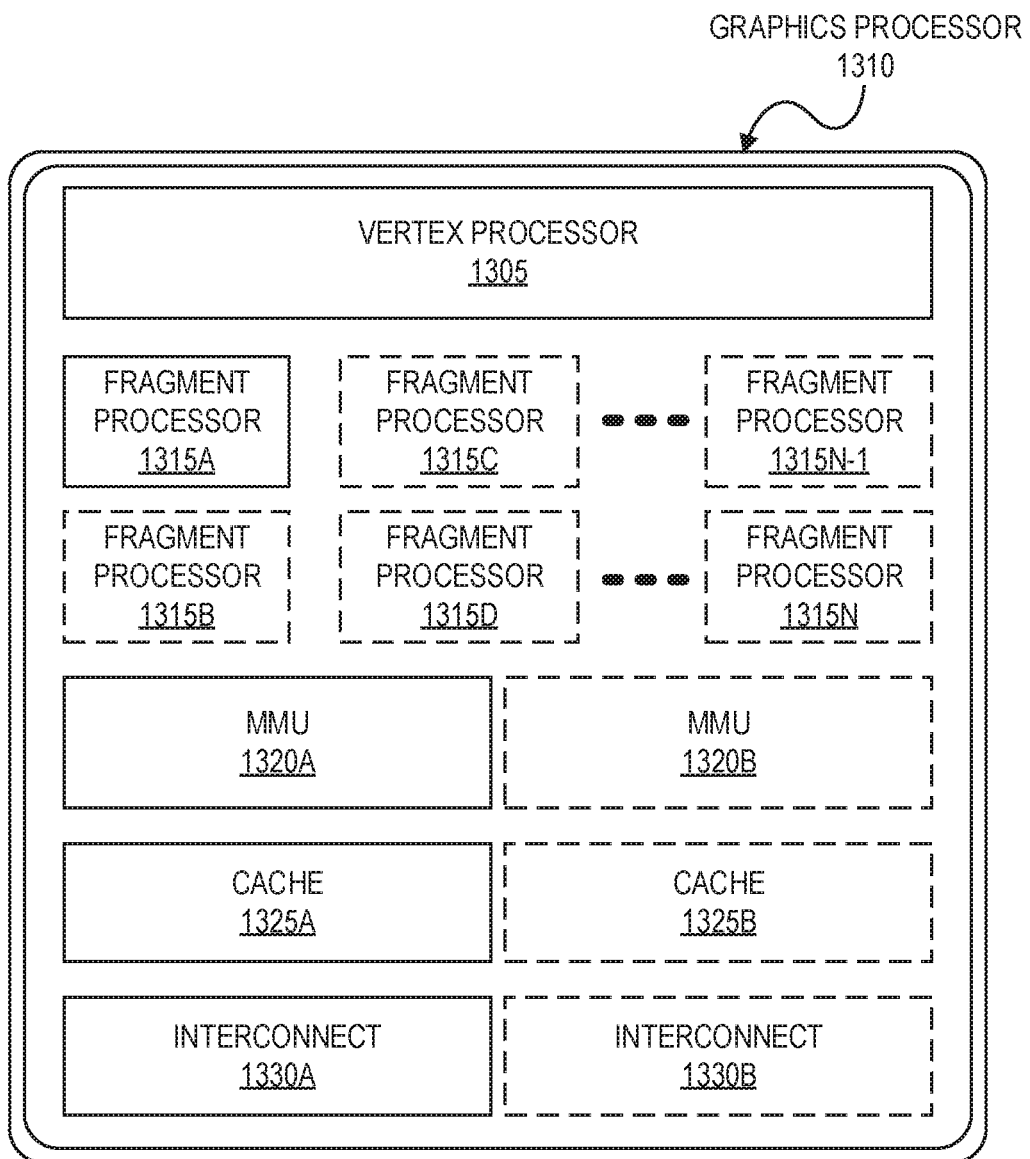
FIGS. 13A-B illustrates an exemplary graphics processor of a system on a chip integrated circuit that may be fabricated using one or more IP cores.
Figure 13B:
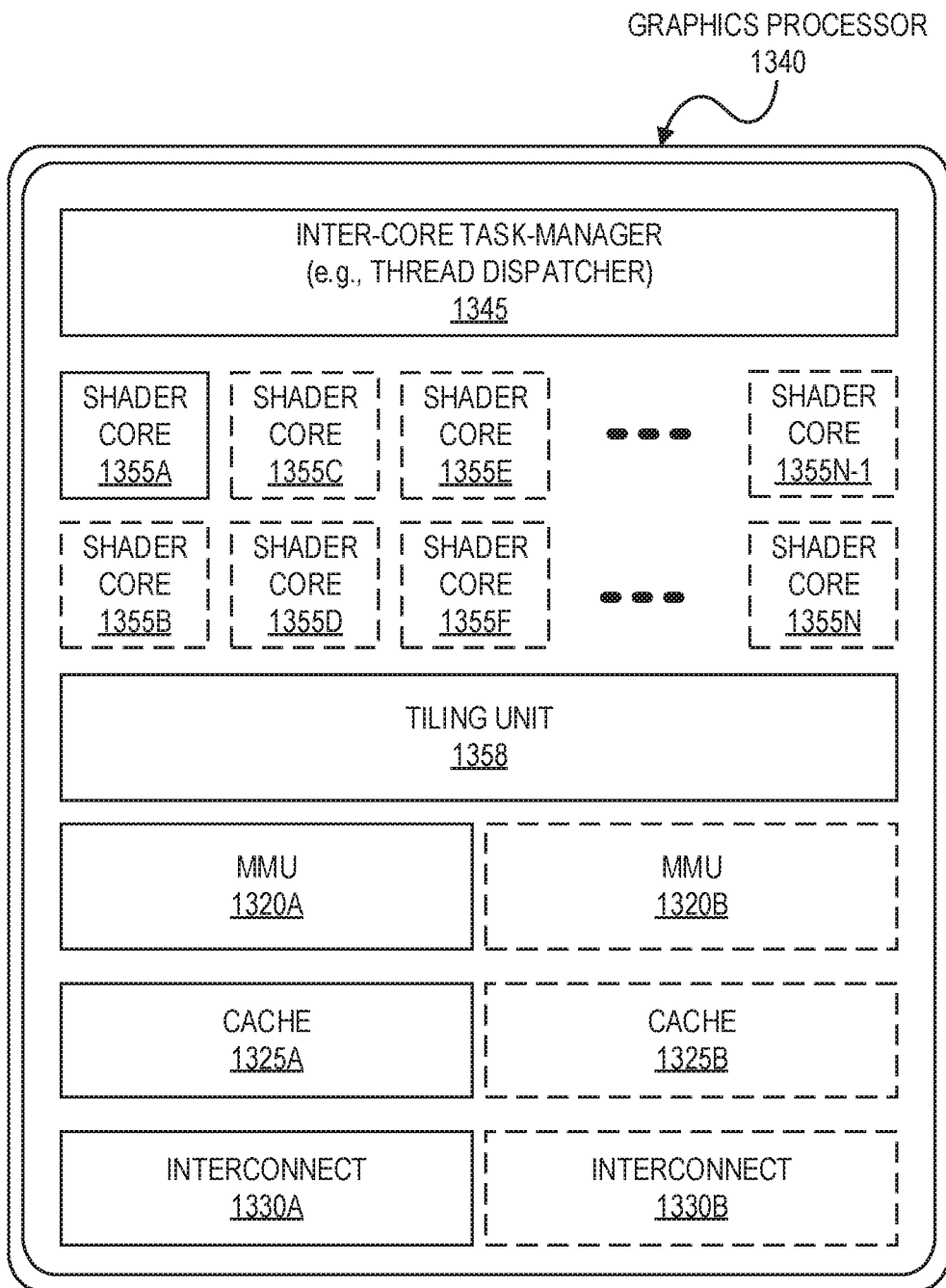

FIGS. 13A-13B are block diagrams illustrating exemplary graphics processors for use within an SoC, according to embodiments described herein. FIG. 13A illustrates an exemplary graphics processor 1310 of a system on a chip integrated circuit that may be fabricated using one or more IP cores, according to an embodiment. FIG. 13B illustrates an additional exemplary graphics processor 1340 of a system on a chip integrated circuit that may be fabricated using one or more IP cores, according to an embodiment. Graphics processor 1310 of FIG. 13A is an example of a low power graphics processor core. Graphics processor 1340 of FIG. 13B is an example of a higher performance graphics processor core. Each of the graphics processors 1310, 1340 can be variants of the graphics processor 1210 of FIG. 12.

As shown in FIG. 13A, graphics processor 1310 includes a vertex processor 1305 and one or more fragment processor(s) 1315A-1315N (e.g., 1315A, 1315B, 1315C, 1315D, through 1315N-1, and 1315N). Graphics processor 1310 can execute different shader programs via separate logic, such that the vertex processor 1305 is optimized to execute operations for vertex shader programs, while the one or more fragment processor(s) 1315A-1315N execute fragment (e.g., pixel) shading operations for fragment or pixel shader programs. The vertex processor 1305 performs the vertex processing stage of the 3D graphics pipeline and generates primitives and vertex data. The fragment processor(s) 1315A-1315N use the primitive and vertex data generated by the vertex processor 1305 to produce a framebuffer that is displayed on a display device. In one embodiment, the fragment processor(s) 1315A-1315N are optimized to execute fragment shader programs as provided for in the OpenGL API, which may be used to perform similar operations as a pixel shader program as provided for in the Direct 3D API.

Graphics processor 1310 additionally includes one or more memory management units (MMUs) 1320A-1320B, cache(s) 1325A-1325B, and circuit interconnect(s) 1330A-1330B. The one or more MMU(s) 1320A-1320B provide for virtual to physical address mapping for the graphics processor 1310, including for the vertex processor 1305 and/or fragment processor(s) 1315A-1315N, which may reference vertex or image/texture data stored in memory, in addition to vertex or image/texture data stored in the one or more cache(s) 1325A-1325B. In one embodiment the one or more MMU(s) 1320A-1320B may be synchronized with other MMUs within the system, including one or more MMUs associated with the one or more application processor(s) 1205, image processor 1215, and/or video processor 1220 of FIG. 12, such that each processor 1205-1220 can participate in a shared or unified virtual memory system. The one or more circuit interconnect(s) 1330A-1330B enable graphics processor 1310 to interface with other IP cores within the SoC, either via an internal bus of the SoC or via a direct connection, according to embodiments.

As shown FIG. 13B, graphics processor 1340 includes the one or more MMU(s) 1320A-1320B, caches 1325A-1325B, and circuit interconnects 1330A-1330B of the graphics processor 1310 of FIG. 13A. Graphics processor 1340 includes one or more shader core(s) 1355A-1355N (e.g., 1455A, 1355B, 1355C, 1355D, 1355E, 1355F, through 1355N-1, and 1355N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 1340 includes an inter-core task manager 1345, which acts as a thread dispatcher to dispatch execution threads to one or more shader cores 1355A-1355N and a tiling unit 1358 to accelerate tiling operations for tile-based rendering, in which rendering operations for a scene are subdivided in image space, for example to exploit local spatial coherence within a scene or to optimize use of internal caches.

Figure 14A:
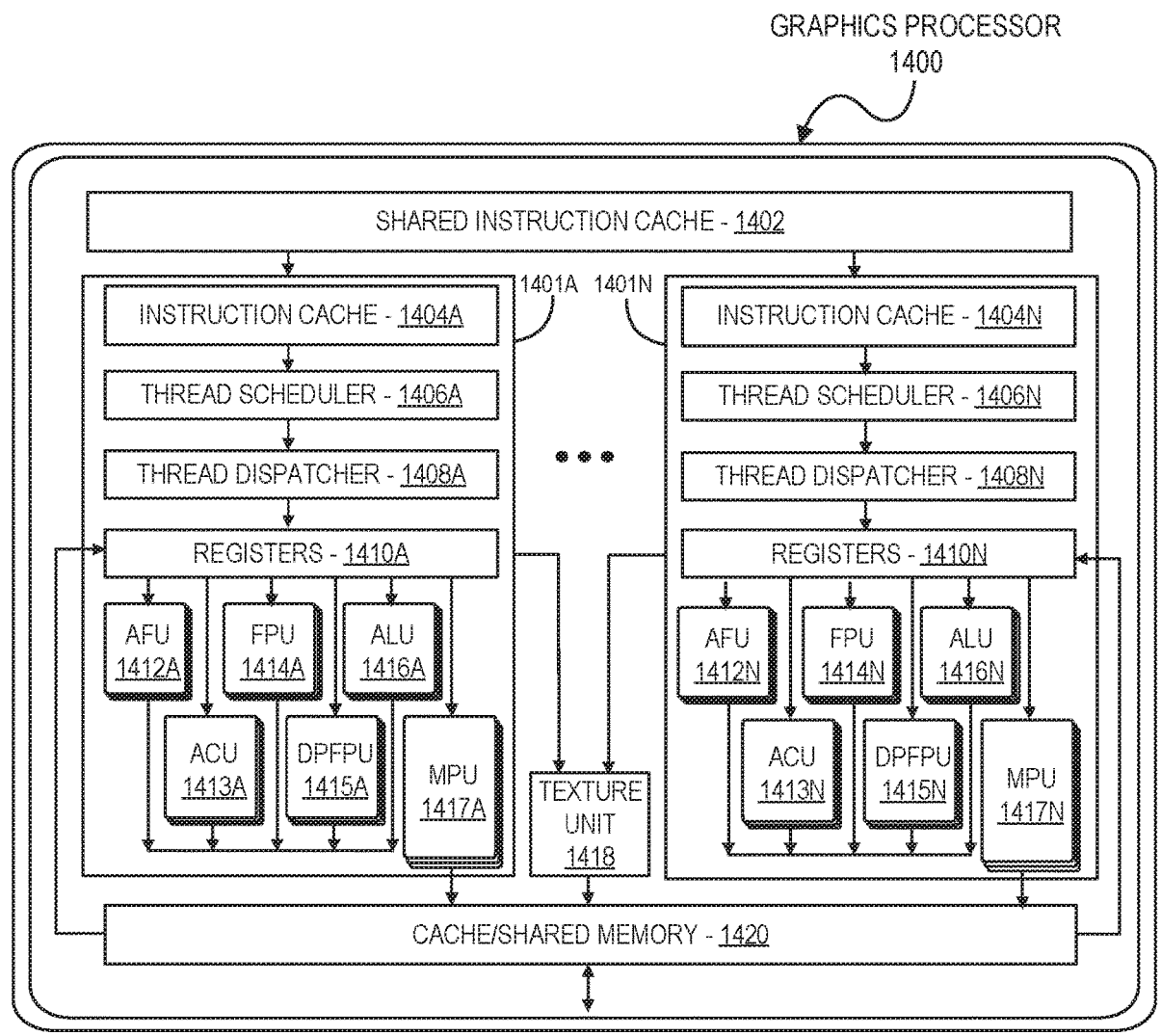
FIGS. 14A-B illustrates an additional exemplary graphics processor of a system on a chip integrated circuit that may be fabricated using one or more IP cores.
Figure 14B:
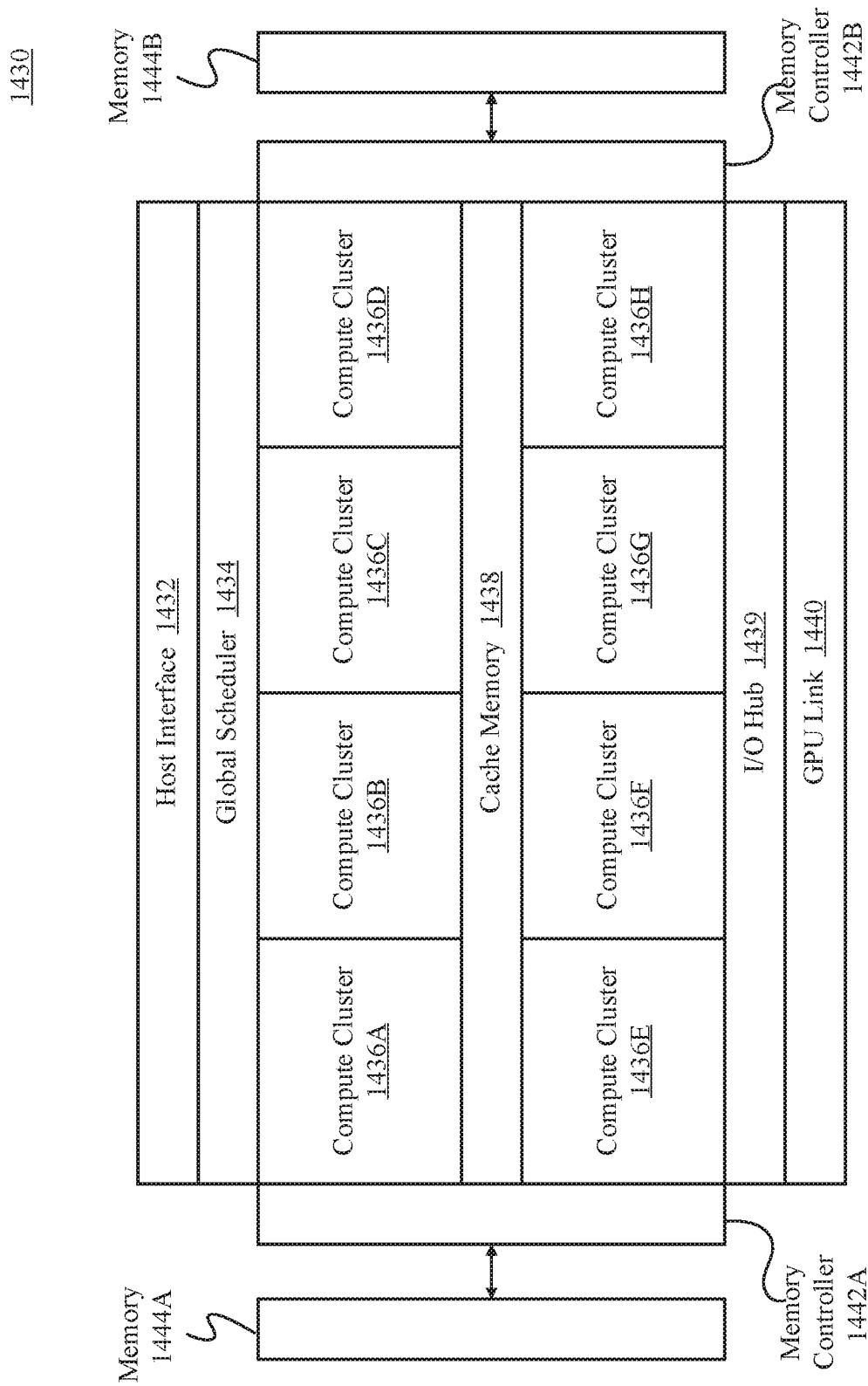

FIGS. 14A-14B illustrate additional exemplary graphics processor logic according to embodiments described herein. FIG. 14A illustrates a graphics core 1400 that may be included within the graphics processor 1210 of FIG. 12, and may be a unified shader core 1355A-1355N as in FIG. 13B. FIG. 14B illustrates an additional highly-parallel general-purpose graphics processing unit 1430, which is a highly-parallel general-purpose graphics processing unit suitable for deployment on a multi-chip module.

As shown in FIG. 14A, the graphics core 1400 includes a shared instruction cache 1402, a texture unit 1418, and a cache/shared memory 1420 that are common to the execution resources within the graphics core 1400. The graphics core 1400 can include multiple slices 1401A-1401N or partition for each core, and a graphics processor can include multiple instances of the graphics core 1400. The slices 1401A-1401N can include support logic including a local instruction cache 1404A-1404N, a thread scheduler 1406A-1406N, a thread dispatcher 1408A-1408N, and a set of registers 1410A-1440N. To perform logic operations, the slices 1401A-1401N can include a set of additional function units (AFUs 1412A-1412N), floating-point units (FPU 1414A-1414N), integer arithmetic logic units (ALUs 1416-1416N), address computational units (ACU 1413A-1413N), double-precision floating-point units (DPFPU 1415A-1415N), and matrix processing units (MPU 1417A-1417N).

Some of the computational units operate at a specific precision. For example, the FPUs 1414A-1414N can perform single-precision (32-bit) and half-precision (16-bit) floating point operations, while the DPFPUs 1415A-1415N perform double precision (64-bit) floating point operations. The ALUs 1416A-1416N can perform variable precision integer operations at 8-bit, 16-bit, and 32-bit precision, and can be configured for mixed precision operations. The MPUs 1417A-1417N can also be configured for mixed precision matrix operations, including half-precision floating point and 8-bit integer operations. The MPUs 1417-1417N can perform a variety of matrix operations to accelerate machine learning application frameworks, including enabling support for accelerated general matrix to matrix multiplication (GEMM). The AFUs 1412A-1412N can perform additional logic operations not supported by the floating-point or integer units, including trigonometric operations (e.g., Sine, Cosine, etc.).

As shown in FIG. 14B, a general-purpose processing unit (GPGPU) 1430 can be configured to enable highly-parallel compute operations to be performed by an array of graphics processing units. Additionally, the GPGPU 1430 can be linked directly to other instances of the GPGPU to create a multi-GPU cluster to improve training speed for particularly deep neural networks. The GPGPU 1430 includes a host interface 1432 to enable a connection with a host processor. In one embodiment the host interface 1432 is a PCI Express interface. However, the host interface can also be a vendor specific communications interface or communications fabric. The GPGPU 1430 receives commands from the host processor and uses a global scheduler 1434 to distribute execution threads associated with those commands to a set of compute clusters 1436A-1436H. The compute clusters 1436A-1436H share a cache memory 1438. The cache memory 1438 can serve as a higher-level cache for cache memories within the compute clusters 1436A-1436H.

The GPGPU 1430 includes memory 14434A-14434B coupled with the compute clusters 1436A-1436H via a set of memory controllers 1442A-1442B. In various embodiments, the memory 1434A-1434B can include various types of memory devices including dynamic random access memory (DRAM) or graphics random access memory, such as synchronous graphics random access memory (SGRAM), including graphics double data rate (GDDR) memory.

In one embodiment the compute clusters 1436A-1436H each include a set of graphics cores, such as the graphics core 1400 of FIG. 14A, which can include multiple types of integer and floating point logic units that can perform computational operations at a range of precisions including suited for machine learning computations. For example and in one embodiment at least a subset of the floating point units in each of the compute clusters 1436A-1436H can be configured to perform 16-bit or 32-bit floating point operations, while a different subset of the floating point units can be configured to perform 64-bit floating point operations.

Multiple instances of the GPGPU 1430 can be configured to operate as a compute cluster. The communication mechanism used by the compute cluster for synchronization and data exchange varies across embodiments. In one embodiment the multiple instances of the GPGPU 1430 communicate over the host interface 1432. In one embodiment the GPGPU 1430 includes an I/O hub 1439 that couples the GPGPU 1430 with a GPU link 1440 that enables a direct connection to other instances of the GPGPU. In one embodiment the GPU link 1440 is coupled to a dedicated GPU-to-GPU bridge that enables communication and synchronization between multiple instances of the GPGPU 1430. In one embodiment the GPU link 1440 couples with a high speed interconnect to transmit and receive data to other GPGPUs or parallel processors. In one embodiment the multiple instances of the GPGPU 1430 are located in separate data processing systems and communicate via a network device that is accessible via the host interface 1432. In one embodiment the GPU link 1440 can be configured to enable a connection to a host processor in addition to or as an alternative to the host interface 1432.

While the illustrated configuration of the GPGPU 1430 can be configured to train neural networks, one embodiment provides alternate configuration of the GPGPU 1430 that can be configured for deployment within a high performance or low power inferencing platform. In an inferencing configuration the GPGPU 1430 includes fewer of the compute clusters 1436A-1436H relative to the training configuration.

Additionally, the memory technology associated with the memory 1434A-1434B may differ between inferencing and training configurations, with higher bandwidth memory technologies devoted to training configurations. In one embodiment the inferencing configuration of the GPGPU 1430 can support inferencing specific instructions. For example, an inferencing configuration can provide support for one or more 8-bit integer dot product instructions, which are commonly used during inferencing operations for deployed neural networks.

Four Corner High Performance Depth Test

Figure 15:
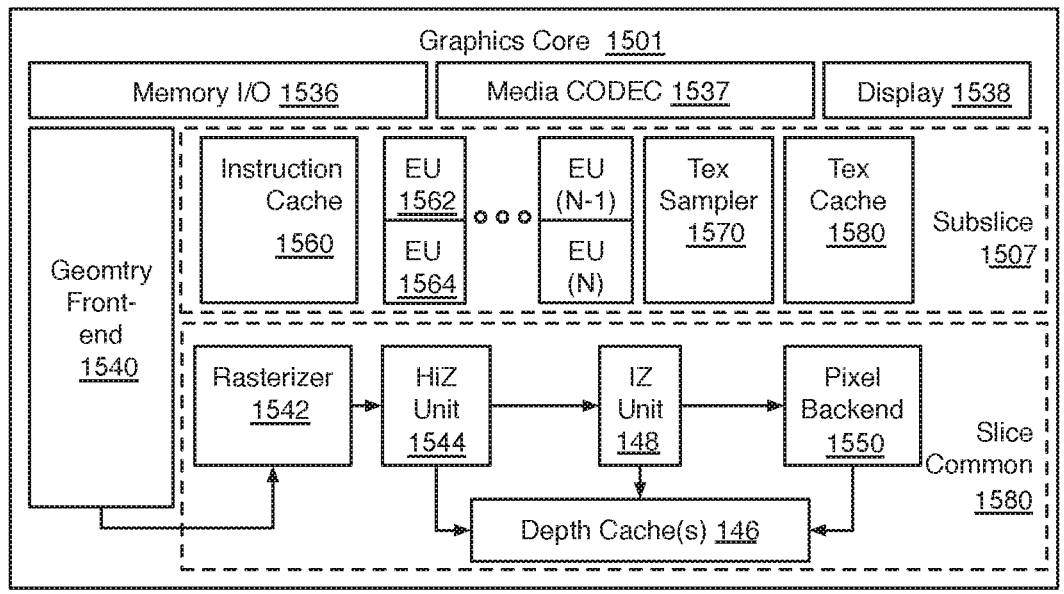
FIG. 15 illustrates a functional block diagram of a graphics processor core employing hierarchical Z hardware.

The following embodiments are described in U.S. Pat. No. 9,569,882, which is assigned to the assignee of the present application. FIG. 15 is a functional block diagram of a graphics processor core 1501 in accordance with an embodiment employing hierarchical-z (HiZ) hardware to perform at least one of the multi-pixel/sample level depth testing methods described herein. As shown in FIG. 15, graphics processor core 1501 includes a memory I/O 1536, media encoder/decoder 1537, and display pipeline hardware 1538. The geometry front-end logic circuitry 1530 is coupled to rasterizer 1520. Front-end logic circuitry 1540 may include for example, a command streamer, vertex shader, hull shader, tesselator, geometry shader, and polygon setup. In the particular architecture illustrated in FIG. 15, rasterizer 1542 is part of slice common 1508, which includes other fixed-function and/or programmable logic circuitry configured to perform graphics pipeline processing operations downstream of the rasterizer. Logic circuitry in slice common 1508 may be coupled in a scalable manner to logic circuitry of one or more subslice 1507. Subslice 1507 is also responsible for processing tasks within the graphics pipeline and further includes instruction cache 1560, a plurality of execution units (EU) 1562, 1564, etc., texture sampler 1570 and texture cache 1580 also. Each EU generally has one or more single-instruction-multiple-data (SIMD) machine and a number of vector arithmetic logic units (ALU). Texture sampler 1570 performs texture processing, for example mapping between a texel space and a pixel space with sampling and filtering functions designed to avoid frequency dependent artifacts, etc.

Figure 16:
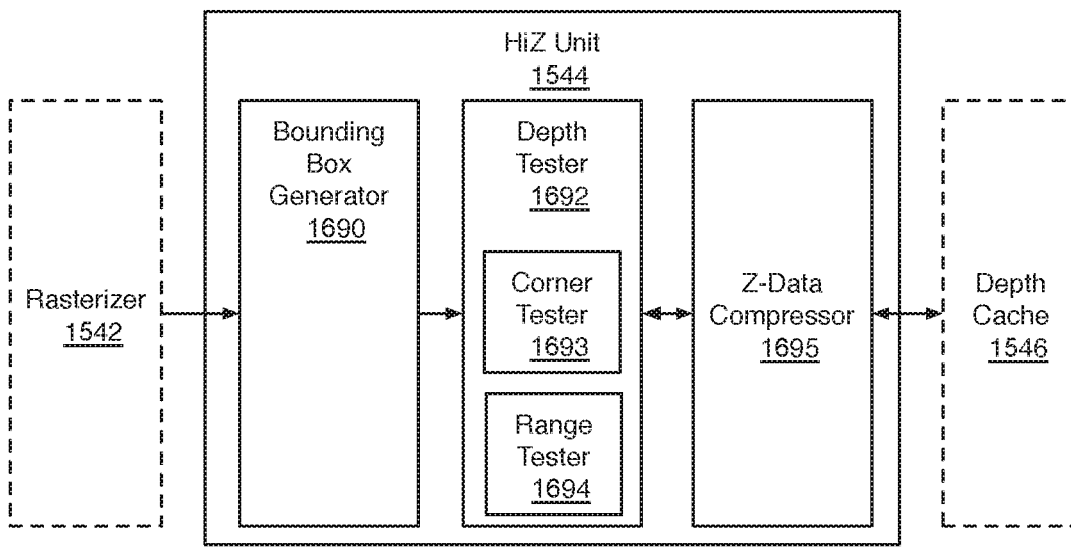
FIG. 16 is a functional block diagram of one embodiment of a hierarchical Z unit.

In slice common 1508, an output of rasterizer 1542 is coupled to an input of HiZ unit 1544. HiZ unit 1544 is further coupled an intermediate-z (IZ) unit 1548 and the pixel backend 1550, all of which are coupled to depth cache(s) 1546. In embodiments, HiZ unit 1544 includes logic circuitry to perform one or more of the multi-pixel/sample depth testing operations described further elsewhere herein. FIG. 16 is a functional block diagram of HiZ unit 1544, in accordance with an exemplary embodiment. As shown, HiZ unit 1544 includes a source data bounding-box generator 1690 having logic circuitry with an input coupled to rasterizer 1542. HiZ unit 1544 includes a depth tester 1692 having logic circuitry with an input coupled to an output of bounding-box generator 1690. The logic circuitry of depth tester 1692 further includes a corner tester 1693 and a depth range tester 1694. HiZ unit 1544 includes a z-data compressor 1695 having logic circuitry with an input coupled to an output of corner depth tester 1692. Compressed depth buffer output from the z-data compressor 1695 is coupled to an input of depth cache(s) 1546.

The exemplary architecture shown in FIG. 16, HiZ unit 1644 takes advantage of the continuous nature of the depth data as the depth values (z-values) often belong to the same 3D plane. In exemplary embodiments described further below, corner depth tester 1693 is to perform a multi-corner depth test, which compares a depth value determined from a source data plane equation at each of at least three corners of the source data bound to depth values determined for positions within a destination plane equation that correspond to those corners. In one advantageous embodiment, the multi-corner depth test is a four-corner depth test as further described below. Where a multi-corner depth test is not utilized, range tester 1694 performs a comparison of depth ranges. In further embodiments also described below, bounding-box generator 1690 is to determine a bounding-box of variable size over which a depth test, such as a four-corner depth test, is to be performed. In further embodiments described below, z-data compressor 1695 is to write depth data representations to a depth buffer (e.g., provided in depth cache 1546) based on a result of the depth test. In advantageous embodiments, z-data compressor 1695 outputs depth data representations having at least one compressed format, for example based on a plane equation, associated with the data group prevailing in a depth test, such as a four-corner depth test.

Notably, the logic circuitry units illustrated in FIG. 16, and their functional equivalents, are not necessary in all embodiments described herein. For example, in alternative embodiments, HiZ unit 1544 includes bounding-box generator 1690, but lacks four-corner depth tester 1692; or HiZ unit 1644 includes four-corner depth tester 1692, but lacks bounding-box generator 1690; or HiZ unit 1544 includes four-corner depth tester 1692 and bounding-box generator 1690, but lacks z-data compressor 1695; or HiZ unit 1544 includes four-corner depth tester 1692 and z-data compressor 1695, but lacks bounding-box generator 1690; or HiZ unit 1544 includes bounding-box generator 1690 and z-data compressor 1695, but lacks four-corner depth tester 1692. Other configurations of HiZ unit 1544 will also be understood to be possible based the following description of the logic circuitry function and architecture. Furthermore, one or more of the functions of the HiZ unit 1544 may be performed within a graphics processing software stack, implemented for example with one or more of API functions, kernel operations, or as user-functions executing in the application space.

Figure 17:
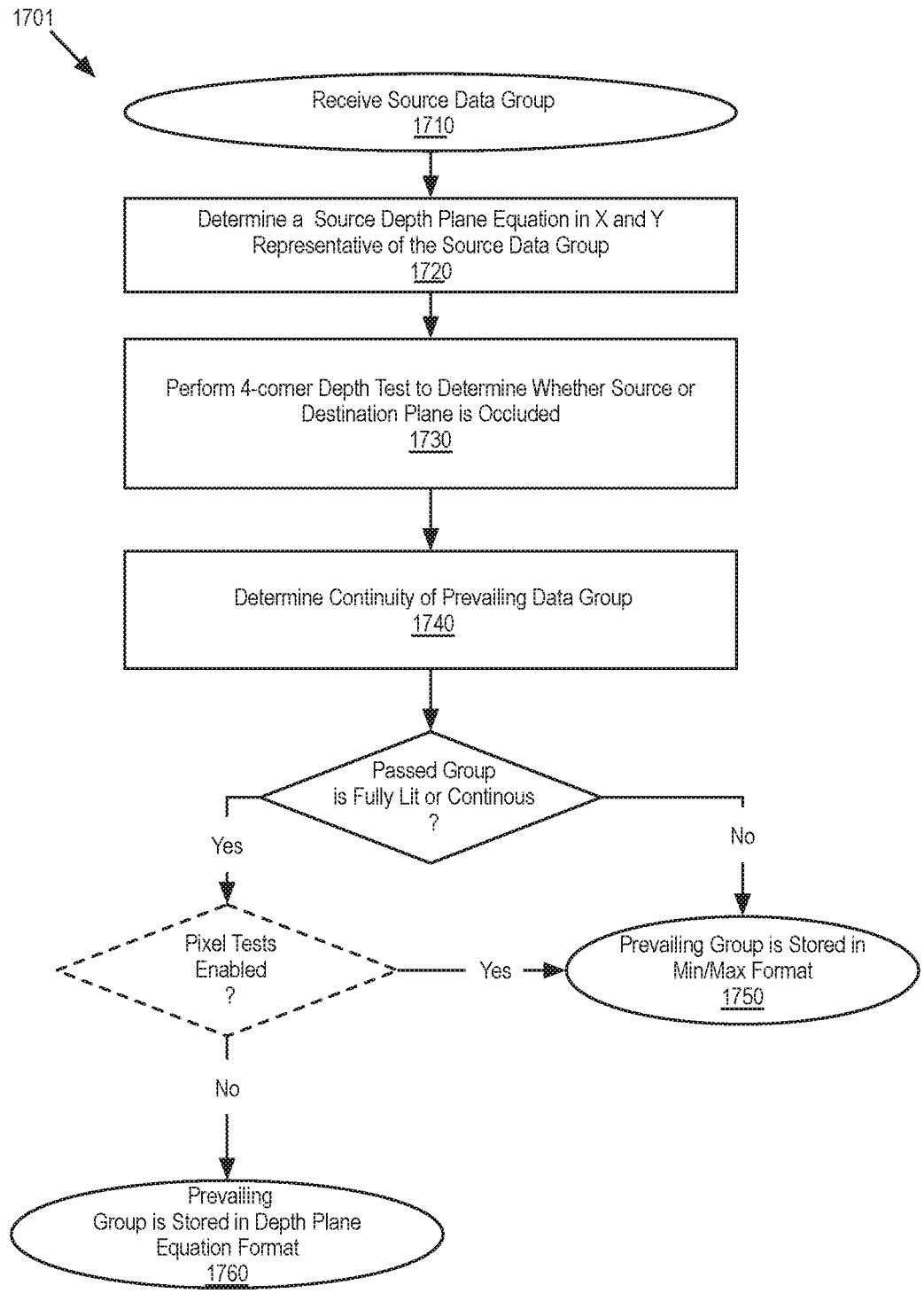
FIG. 17 is a flow diagram illustrating a four-corner depth testing method, in accordance with an embodiment.
Figure 18:
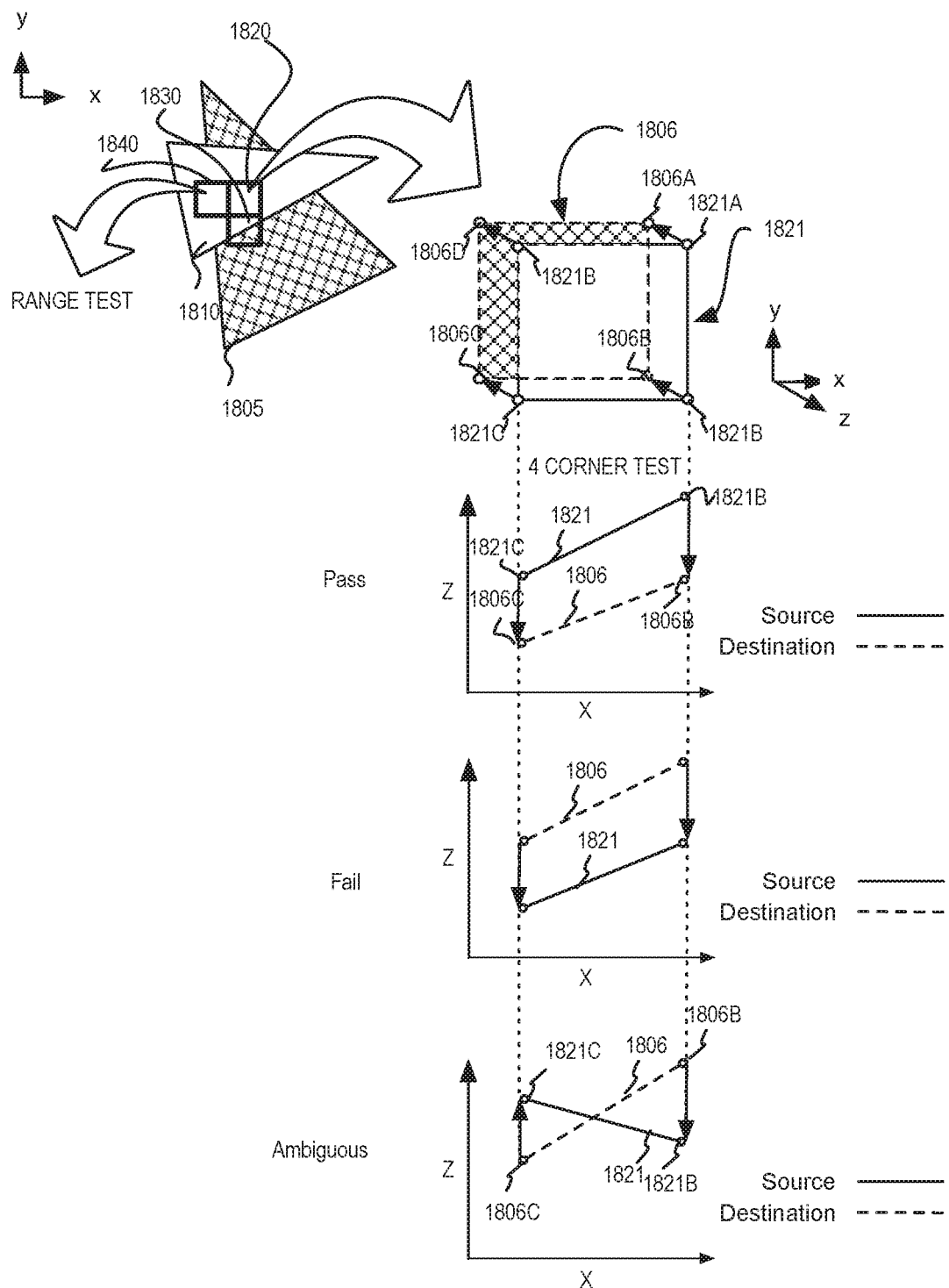
FIG. 18 is a schematic illustrating depth testing polygon data groups.

FIG. 17 is a flow diagram illustrating a four-corner depth testing method 1701, in accordance with an embodiment. In method 1701, source depth data associated with the source data group is to be tested against depth data stored in the depth buffer, referred to herein as "destination" depth data. FIG. 18 is a schematic illustrating depth testing of exemplary polygon data groups using the method illustrated in FIG. 17, in accordance with an embodiment.

Referring first to FIG. 17, method 1701 begins with receiving a source data group or tile at operation 1710. The source data group is received from a rasterizer upstream in the graphics pipeline. The source data group is associated with an x,y address and is of a known size. Embodiments herein are not limited with respect to the size of the source data group, which may be dependent on a rasterization rate, etc. In one exemplary embodiment the source data group is an 8×8 tile of adjacent pixels (i.e., a 64 pixel square). Within the exemplary xy plane illustrated in FIG. 18, the scene geometry includes a polygon 1810 partially occluding polygon 1805. In a first embodiment illustrated in FIG. 18, source data group 1820 is associated with a 2D array of pixel/sample positions fully lit by polygon 1810. In a second embodiment illustrated in FIG. 18, source data group 1830 is associated with a 2D array of pixel/sample positions only partially lit by polygon 1810. In a third embodiment illustrated in FIG. 18, source data group 1840 is associated with a 2D array of pixel/sample positions and is again fully lit by polygon 1810. For these three address ranges, a depth buffer contains destination data for corresponding rectangular data groups inclusive of polygon 1805. Notably, the destination data corresponding to source data group 1820 is fully lit by polygon 1805. The destination data corresponding to source data group 1830 is fully lit by polygon 1805. The destination data corresponding to source data group 1840 is only partially lit by polygon 1805. Therefore, for each of the first two embodiments depicted in FIG. 18, the depth-buffer data is continuous within the xy bounds of the corresponding source data group. The depth-buffer data for the third embodiment however, is discontinuous within the xy bounds of the source data group 1840.

Referring again to FIG. 17, method 1701 continues at operation 1720 where a rectangular source data group of pixels or samples is represented as a source depth plane equation in terms of x,y position within the source data group. The continuous nature of the z-data (i.e., depth values) is leveraged for efficient storage and depth testing. With points within the rectangular source data group belonging to the same 3D plane, high pixel-level accuracy may be maintained with a compressed representation of the depth values associated with the source data. In the exemplary embodiment, the depth function generated is in the form: $Z(x,y) = Z_0 + d_x(x) + d_y(y)$, Eq. 1 where $Z_o$ is a reference depth value within the source data group, such as the maximum or minimum depth value of the lit pixels/samples in the source data group. Terms $d_x$, $d_y$ represent the incremental changes in depth for a single pixel step in the x and y direction, respectively, from the x,y location corresponding to the reference depth. With the rectangular dimension of the source data group known, the extent of the depth function $Z(x,y)$ can be determined at each corner of the source data group, whether or not the source data group is fully lit, through interpolation of each lit pixel/sample position. For example, in further reference to FIG. 18, a source depth plane is interpolated to all four corners of the bounded source data group 1830 based on those pixels/samples within the group that are lit by polygon 1810.

In an embodiment, a four-corner depth test is performed to determine whether the source or destination plane is occluded. In the four-corner testing method 1701 (FIG. 17), each corner of the source depth plane generated at operation 1720 is compared to a corresponding corner of a destination depth plane stored in the depth buffer. In other words, four pairs of depth values are compared, one pair co-located at each xy corner position of the source depth plane. Depth buffer data may be represented in memory in compressed form as a plane equation just as was described for the source data group whenever the depth-buffer data is continuous within the xy bounds of the source data group being tested. Hence, two plane equations, source and destination, can be compared to determine if the source data group is behind or in front of what is already represented in the depth buffer. In the exemplary embodiment, the source plane equation is evaluated at each of four corners to determine four source depth values. Likewise, the destination plane equation encode is evaluated at each of the four corners to determine four destination depth values. Such processing is performed in parallel in advantageous embodiments. The resulting two sets of four depth values are then compared according to a predetermined depth test function with each corner of the data group yielding a single depth test result.

Embodiments are not limited in with respect to specific corner depth test functions, as they are dependent on whether depth value is defined to increase or decrease with greater distance from the viewpoint, etc. The depth test function may be, for example a "less than test", or a "greater than" test, etc. Referring again to the example illustrated in FIG. 18, source depth plane 1820 has source corner depth values of 1821A, 1821B, 1821C, and 1821D. A destination plane 1806 is evaluated at 1806A, 1806B, 1806C, and 1806D. For the depth test, source corner depth value 1821A is compared to the destination corner depth value 1806A, source corner depth value 18216 is compared to the destination corner depth value 1806B, source corner depth value 1821C is compared to the destination corner depth value 1806C, and source corner depth value 1821D is compared to the destination corner depth value 1806D. The four-corner test may be likewise performed on the source data group 1830, using interpolated corner values as needed, and compared to a corresponding destination depth plane. For the source data group 1840 however, because the corresponding destination data is discontinuous, the depth test defaults to a range-based test, as described elsewhere herein.

In an embodiment, if the results of the four corner comparisons all agree (e.g., either all four comparisons "pass" or all four comparisons "fail"), all of the pixels/samples in the data group represented by the depth plane are deemed to have that result (e.g., all "pass" or all "fail"). As such, the four-corner depth test 101 may reduce the number of depth tests relative to a pixel-level test by a factor of 4 (e.g., 16 pixels in the source data group/4 depth tests performed), or more. In further reference to the example shown in FIG. 18, where z-value increases with proximity to the viewpoint, and all of the four source corner depth values 1821A-1821D are larger than the corresponding four destination corner depth values 1806A-1806D, source depth plane 1820 passes the depth test as being closer to the viewpoint. The pixels/samples associated with the source depth plane 1821 are retained in the depth buffer as occluding the pixels/samples associated with destination depth plane 1806. Alternatively, where all of the four source corner depth values 1821A-1821D are smaller than the corresponding destination corner depth values 1806A-1806D, source depth plane 1820 fails the depth test, being farther from the viewpoint. The pixels/samples associated with the destination depth plane 1806 are retained in the depth buffer as occluding the pixels/samples associated with source depth plane 1820.

In a further embodiment, in response to at least one corner depth test having a different result than another, the result of the four-corner test is deemed "ambiguous" and the source data group is passed to a subsequent stage where pixels/samples of the data group are tested individually (e.g., by IZ unit 1548 in FIG. 15) to ensure proper depth ordering of the scene. In further reference to the example shown in FIG. 18, not all four of the source corner depth values 1821A-1821D are larger than the corresponding destination corner depth values 1806A-1806D. Specifically source corner depth value 18216 is smaller than destination corner depth value 1806B, indicating at least a portion of source depth plane 1821 is occluded by at least a portion of destination depth plane 1806. However, because source corner depth value 1821C is larger than destination corner depth value 1806C, the four-corner test is ambiguous with at least a portion of destination depth plane 1806 occluded by at least a portion of source depth plane 1821.

In an embodiment where the four-corner depth test is unambiguous, the depth data written to the depth-buffer is of a format that depends on the continuity or fully lit status of the data group that prevails in the four-corner test. As shown in FIG. 17, at operation 1740 the lit status of the prevailing data group is determined. In response to the passed data group being only partially lit (i.e., FullyLit=false), at operation 1750 the minimum and maximum depth values for the lit pixels/samples of the prevailing group are stored in the depth buffer (either from a prior writing if a destination depth data prevails, or newly written if the prevailing source data is to be an update to the destination). Further depth tests against this section of the image will then continue to default to a range test until this data is overwritten with a plane equation entry representation of a continuous, or fully lit data group.

Figure 19:
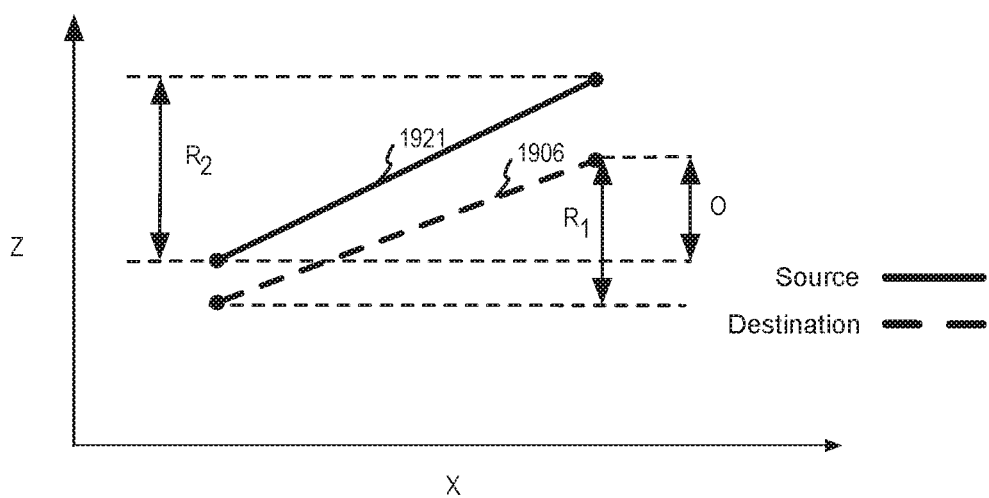
FIG. 19 is a graph illustrating one advantage of four-corner depth testing, in accordance with an embodiment.

For example, in reference to FIG. 18, where the source data group 1830 is determined to pass the four-corner test, the maximum depth value and the minimum depth value is stored to the depth buffer because the prevailing data group 1830 is not fully lit. In response to the prevailing data group being fully lit (i.e., FullyLit=true), method 1701 proceeds toward operation 1760 where the source depth plane equation for the prevailing group is stored to the depth buffer (either written as a destination update for a prevailing source or retained as a prevailing destination). In a further embodiment, writing of the prevailing depth plane equation to the depth buffer is additionally predicated on whether a down stream pixel test (e.g., alpha test, alpha to coverage, etc.) is enabled. In response to an enabled down stream pixel test, the maximum depth value and the minimum depth value is written to the depth buffer at operation 150.

Where a depth plane equation is written to the depth buffer, the depth data for the pixel/sample group is in a compressed format because it is possible to store d.sub.x and d.sub.y in fewer bits than is required for any one pixel depth value (typically having at least 24 bits). The depth storage requirements are therefore reduced relative to storing a depth value for each pixel within the xy bounds of the data group. The plane equation format is also less lossy than is storage of depth range, leading to better accuracy, in a subsequent depth test for example. FIG. 19 is a graph illustrating an advantage of four-corner depth testing, in accordance with an embodiment. As shown in FIG. 19, destination depth plane 1806 has a first range R.sub.1 and source depth plane 1821 has a second range R.sub.2, which overlaps R.sub.1 in absolute z by overlap O. Whereas a range test would not be able to resolve such a circumstance, the four-corner depth testing method 1701 will correctly resolve cases where two planes overlap in absolute z but do not actually intersect with each other. Indeed, the four-corner depth test can unambiguously resolve all possible geometrical arrangements where the source and destination planes don't interact.

In an embodiment, a depth-test bounding-box is sized dynamically based on the pattern of lit pixels/samples within a group. A depth-test bounding-box defines the maximum data group size represented as a unit (e.g., a continuous plane) in a group-level depth test (e.g., performed by HiZ unit 1544 in FIG. 15). Dynamic bounding-box sizing may be performed by fixed function logic circuitry represented as bounding-box generator 1690 in FIG. 16. Dynamically determining the depth-test bounding-box has the advantage of greater depth test efficiency by improving the likelihood the depth test (e.g., four-corner test, range test, etc.) will yield an unambiguous result. For embodiments where the depth test performed on the data group within the bounding-box is the four-corner test described above, it is advantageous to determine the corner values as close to the nearest lit pixel as possible for the greatest probability that all the source data group corners will be above or below the destination data values for an unambiguous depth test result. In the exemplary embodiment, a depth-test bounding-box is determined based on the source pixel/sample mask. In one such embodiment, the smallest possible bounding rectangle that contains all lit pixels/samples within one source data group is determined.

Figure 20:
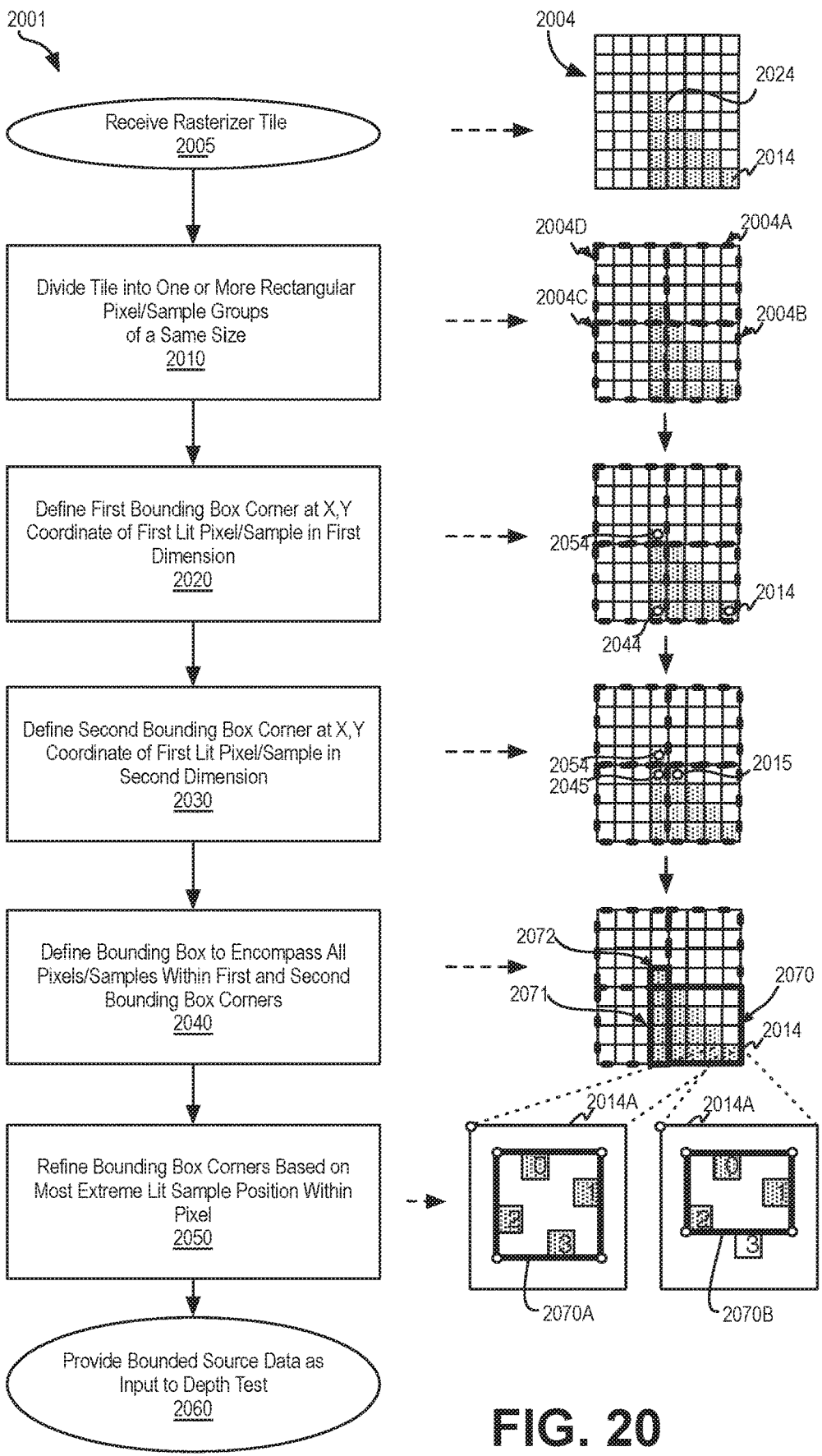
FIG. 20 is a flow diagram illustrating a method of determining a variable depth-test bounding-box of minimum size, in accordance with an embodiment.

FIG. 20 is a flow diagram illustrating a method 2001 for determining a depth-test bounding-box of minimum size, in accordance with an embodiment. Method 2001 begins at operation 2003 with receiving a rasterizer tile 2004. In this example, tile 2004 includes an 8×8 array of samples/pixels. Pixel/sample 2014 is lit and pixel/sample 2024 is unlit. Although the 8×8 dimension of tile 2004 is advantageous in method 2001, alternative embodiments with tiles of differing size or also possible. Method 2001 continues at operation 2010, where the rasterizer tile is divided down into source data groups of all the same size. The number of pixel/sample source data groups identified at operation 2010 may depend on the size of the source data group received at operation 2005. Functionally, the size of the pixel/sample source data group defines the maximum size of a bounding-box over which one depth test will be performed. The exemplary 8×8 tile 2004 is divided into 4×4 pixels/sample quadrants 2004A, 2004B, 2004C, and 2004D. For each pixel/sample source data group (e.g., 2004A), one depth test (e.g., a four-corner depth test) is to be performed if any pixel/sample is lit. In advantageous embodiments therefore, a bounding-box of variable size is calculated for each of the source data groups 2004A-2004D.

At operation 2020, a first bounding-box corner is set to the xy coordinate of a first lit pixel/sample in a first dimension. In hardware this may be performed with the pixel/samples of one source data group (e.g., 2004B) aligned to an xy coordinate system. Beginning at a first corner xy position of the source data group, the xy coordinate of the first lit pixel (e.g., 2014) is determined, for example with a priority encoder that prioritizes on the basis of the first dimension (e.g., x) to identify a maximum (or minimum) x value of the lit pixels/samples at the minimum (or maximum) y. The same algorithm is applied (in parallel) to the other source data groups. As shown in FIG. 20, pixel/sample 2044 is identified as the first lit pixel/sample in the x dimension of minimum y for source data group 2004C, pixel/sample 2054 is identified as the first lit pixel/sample in the x dimension of minimum y for source data group 2004D, and no pixel/sample is lit in source data group 2004A.

At operation 2030, a second bounding-box corner is set to the xy coordinate of a first lit pixel/sample in the second dimension farthest from the lit pixel determined at operation 2020. Beginning at a second corner xy position of the source data group, the xy coordinate of the first lit pixel (e.g., 2015) is determined, for example with a priority encoding algorithm that prioritizes on the basis of the second dimension (e.g., y) to identify a maximum (or minimum) y value of the lit pixels/samples at the minimum (or maximum) x. The same algorithm is applied (in parallel) to the other source data groups. As shown in FIG. 20, pixel/sample 2045 is identified as the first lit pixel/sample in they dimension of minimum x for source data group 2004C, pixel/sample 2054 is identified as the first lit pixel/sample in the y dimension of minimum x for source data group 2004D. At operation 2040, the bounding-box is set to encompass all source data within the rectangle encompassing the first and second bounding-box corners determined at operations 2020, 2030. As shown in FIG. 20, bounding-box 2070 is the smallest rectangular unit that includes all lit pixels of source group 2004B and is the full size of the source data group 2040B (4×4 pixels/samples). Bounding-box 2071 is the smallest rectangular unit including all lit pixels of source group 2040B and is only a 1×4 group of pixels. Bounding-box 2072 is reduced in size to a one pixel/sample such that only one depth test is needed to properly rank the depth of the source group 2004D, and in the most trivial case no depth test is performed (or a default is performed) for source group 2040A.

In embodiments, bounding-box corner position calculations are refined based on sub-pixel sampling positions. In an advantageous embodiment where each pixel is composed of multiple samples, a depth-test bounding-box is sized based on the most extreme sample position with respect to the bounding-box corner being calculated. For a bounding-box corner position of minimum y and maximum x, the position may be refined to reduce the size of bounding-box by less than a pixel to include only the lit sub-pixel sample positions of minimum y and maximum x within the first corner pixel. Similarly, for a bounding-box corner position of maximum y and minimum x, position may be refined to reduce the size of the bounding-box by less than a pixel to include only the lit sub-pixel sample positions of maximum y and minimum x within the second corner pixel. FIG. 20 further illustrates an exemplary 4xMSAA sub-pixel sampling mode where sub-samples 0, 1, 2, and 3 are spatially arranged within the pixel/sample 2014. As shown, a bounding-box 2070B is reduced in size relative to bounding-box 2070A when sub-sample 3 is not lit. In alternative embodiments, sub-pixel sampling positions are ignored, and bounding-box corner positions are determined with pixels considered an atomic unit and completely encompassed by the bounding-box.

Method 2001 ends at operation 2060 where the bounded source data is provided for a single group-level depth test (e.g., one four-corner depth test, one range test, etc.). In the exemplary embodiment, the bounded source data from method 2001 is output from bounding box generator 1690 (FIG. 16) to four-corner tester 1693, which performs the four-corner test method 1701 (FIG. 17). The depth tests for a given rasterizer tile are advantageously performed in parallel with all other pixel/sample source data groups determined for that tile. For example, four-corner depth tests for each of source data groups 2004B, 2004C, and 2004D (i.e., all quadrants having a lit pixel/sample) are performed in parallel with the source data tested for each group limited to the corresponding bounding box. Hence, a source depth plane equation may be generated for each of the source data groups, and as described above in reference to FIG. 17, compared to a destination plane corresponding to the same location.

Figure 21:
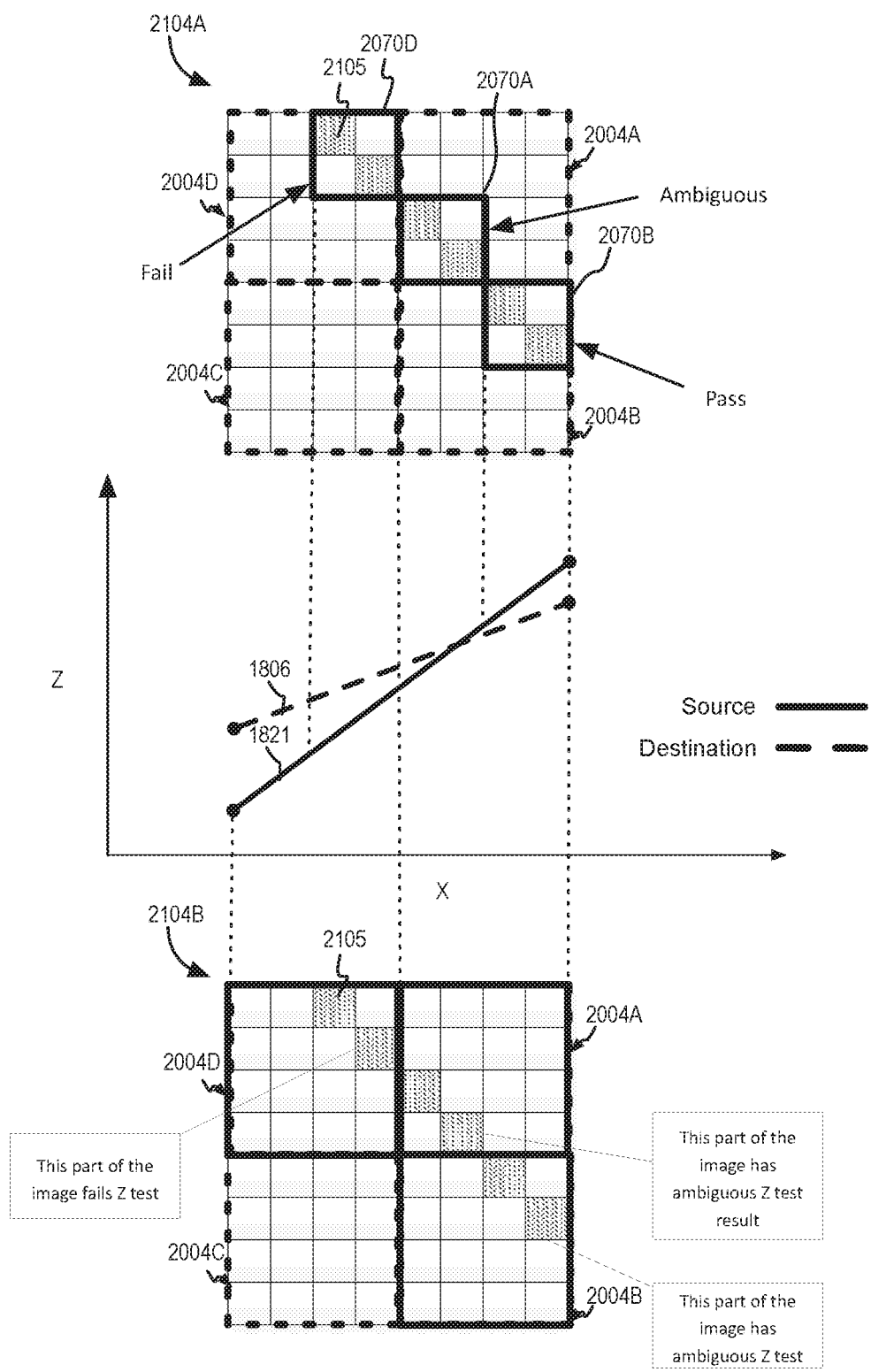
FIG. 21 is a graph illustrating an advantage of four-corner depth testing with a variable source data bounding-box, in accordance with an embodiment.

As noted above, dynamic sizing of the depth-test bounding box increases the probability that a depth test, such as the four-corner depth test, will generate an unambiguous result and thereby avoid subsequent pixel-level testing for all pixels within the bounding box. FIG. 21 is a graph illustrating an advantage of four-corner depth testing with a variable depth-test bounding-box, in accordance with an embodiment. As illustrated, source depth plane 1821 intersects destination depth plane 1806. Lit pixels 2105 on source depth plane 1821 are included within 8×8 rasterizer tile 2104A. The lit pixels 2105 on source depth plane 1821 are also illustrated within 8×8 rasterizer tile 2104B. Both tiles 2104A, 2104B are divided into the quadrants of source data groups 2004A, 2004B, 2004C, and 2004D. For depth testing of rasterizer tile 2104A, bounding-box calculations are enabled, and a depth-test bounding-box size minimization method is performed. For example method 2001 described above is performed to determine up to four variable depth-test bounding-boxes of minimum size. In contrast, for depth testing of rasterizer tile 2105, bounding-box calculations are disabled, and no bounding-box size minimization method is performed.

For rasterizer tile 2104A, the depth-test bounding-box size minimization method determines three bounding boxes 2070A, 2070B, and 2070D for each of source data groups 2004A, 2004B, 2004C, and 2004D containing a lit pixel/sample. A four-corner depth test is then performed on each of the source data groups 2004A, 2004B, 2004D. Following the four-corner testing method 1701, a depth plane equation is determined for each of source data groups 2004A, 2004B, 2004D. Assuming destination plane 406 is continuous within each of the bounding boxes 2070A, 2070B, 2070D, destination depth data is also represented by corresponding plane equations. The source and destination planes 1821, 1806 are evaluated at all of the corners of the bounding boxes 2070A, 2070B, 2070D as three independent four-corner tests generating one "pass" result, one "fail" result, and one "ambiguous" result.

For rasterizer tile 2104B, a four-corner depth test is similarly performed on each of the source data groups 2004A, 2004B, 2004C, and 2004D containing a lit pixel/sample. In this case however, because of the larger bounding box size, three independent four-corner tests generate one "pass" result and two "ambiguous" results. Hence, source data bounding-box size minimization improves the resolving power of the four-corner depth test.

Figure 22:
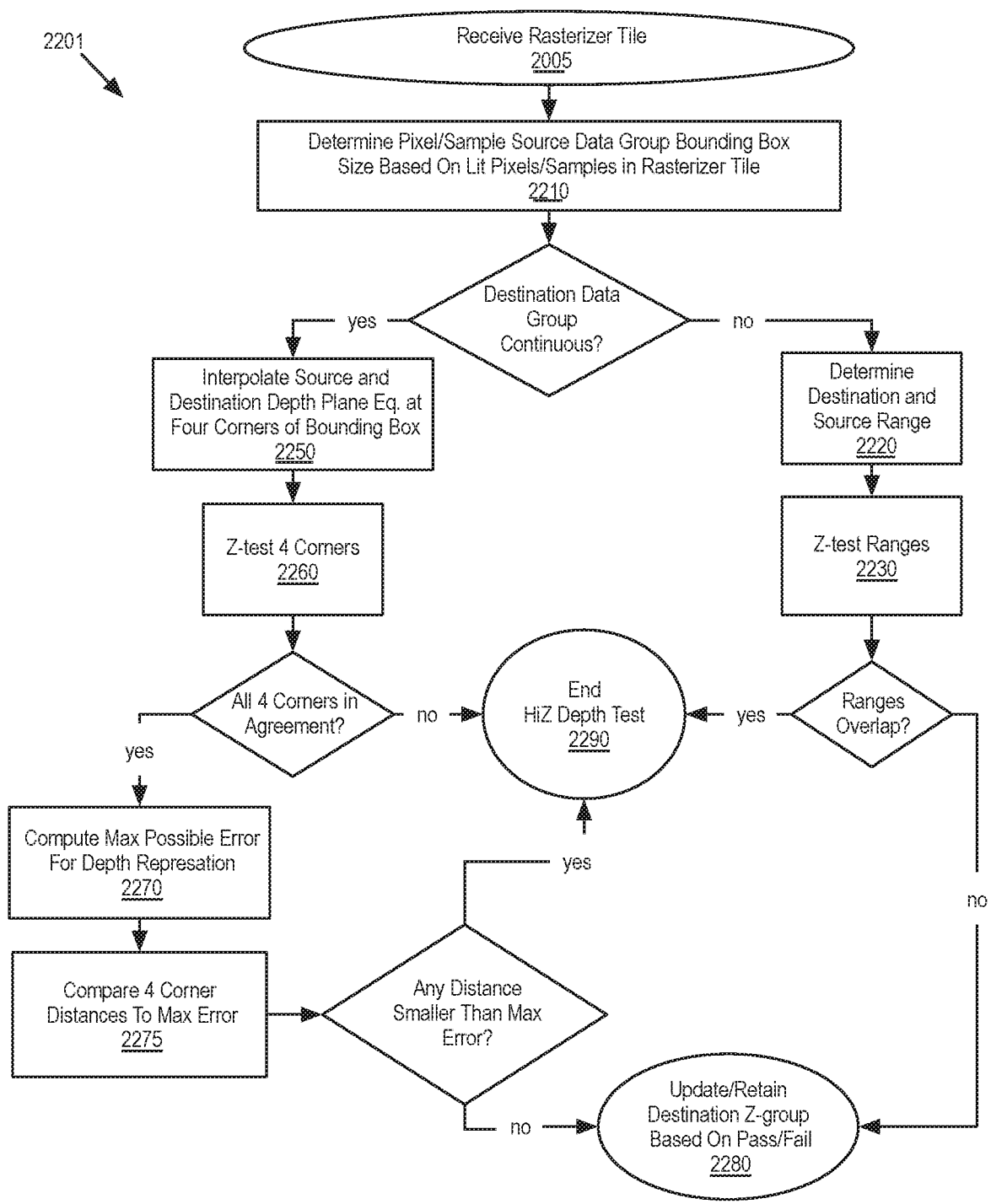
FIG. 22 is a flow diagram illustrating a depth testing method, in accordance with an embodiment.

In an embodiment, the depth test performed on a source data group is dependent on destination data continuity over the extent of a given source data bound. FIG. 22 is a flow diagram illustrating a multi-mode hierarchal depth testing method 2201 incorporating depth-test bounding-box minimization as well as a four-corner depth testing and range depth testing, in accordance with one exemplary embodiment. In a further embodiment, method 2201 is performed by HiZ unit 1544 (FIG. 15).

HiZ method 2201 begins with operation 2005 where the rasterizer tile is received as described above. At operation 2210 one or more depth-test bounding-box of minimum size is determined for the rasterizer tile based on the lit pixels/samples in the tile. In the exemplary embodiment, the method 2001 is performed at operation 2210 to generate at least one source data group bounding-box from the rasterizer tile. In a further embodiment, bounding box generator 1690 (FIG. 16) performs method 2001 at operation 2210. Where an 8×8 pixel/sample array is output from the rasterizer, at least one source data group of no more and 4×4 pixels/sample is determined at operation 2210. In a further embodiment, at least one source data group of less than 4×4 pixel/sample is determined from an 8×8 pixel/sample array.

Recalling that method 1701 may end with storage of either a range or a plane representation of a prevailing data group, depth data which stored in the depth-buffer for a given xy dimension may either be in range format or in plane equation format. A four-corner test is applicable to those circumstances where the destination data is represented by a plane equation from which four corner depth values may be determined. Therefore, a four-corner test is performed in method 2201 on each source data group bounded at operation 2210 where the destination data group is continuous within the extent of the depth test bounding-box determined at operation 2210.

In a first embodiment where destination data is discontinuous within a source data group bound (e.g., as would be the case for source data group 1840 in FIG. 18), method 2201 defaults to a depth range test (e.g. performed by range tester 1694 in FIG. 16). A depth range test entails a single range test instead of multiple corner tests, and as previously discussed in the context of FIG. 5 is less accurate than a four-corner test. The destination and source depth ranges are determined (in parallel) and any method may be enlisted at operation 2220 as embodiments are not limited in this respect. The destination depth range is then compared to the source depth range at operation 2230. Where the source depth range overlaps with the destination range, the range test result is ambiguous and HiZ method 2201 ends at operation 2290. The source data group may then be passed on to a subsequent stage (e.g., IZ unit 1548 in FIG. 15), where an individual pixel/sample depth test is performed on each pixel with the source data group. In the event the ranges do not overlap, method 2201 completes at operation 2280 where the depth information associated with the destination data group is either retained or updated with that of the source data group, based on the unambiguous pass/fail results determined at operation 2230.

In a second embodiment where destination data is continuous within a source data group bound, method 2201 proceeds to operation 2250 where source and destination depth plane equations are interpolated at the four corners of each source data bounding box that was determined at operation 2210. At operation 2260, the four corner depth values are tested as was described above to determine if all corners for one source data group agree on a "pass" or "fail" result. In the exemplary embodiment, four-corner tester 1692 (FIG. 16) performs operation 2260. If not all corners are in agreement, resulting in an ambiguous depth test result, HiZ method 2201 ends at operation 2290. The source data group may then be passed on to a subsequent stage (e.g., IZ unit 1548 in FIG. 15), where an individual pixel/sample depth test is performed on each pixel within the source data group. In response to all corners being in agreement, method 2201 proceeds toward operation 2280 where the depth information associated with the destination data group is either retained or updated with that of the source data group, based on the unambiguous pass/fail results determined at operation 2260.

Apparatus and Method for Optimizing a Hierarchical Depth Buffer

One embodiment of the invention includes extremely efficient, low-cost techniques to significantly improve coarse depth testing and processing. In particular, by utilizing a coverage mask generated for a tile and performing a single comparison between two coefficients of a plane associated with the tile (e.g., Cx and Cy coefficients), the accuracy of min/max determinations by coarse depth testing circuitry/logic is dramatically improved.

As described above, a graphics processor typically conducts a coarse depth pre-shader depth or 'Z' test based on a separate compressed depth buffer that is maintained based on pre-shader Z data. Coarse depth data (HiZ) is represented as min/max ranges covering rectangular sections of the per-pixel depth buffer. For every incoming source, a min and max are computed to compare against the destination values for depth testing. The embodiments previously described determine the min/max values at the extreme edges of the bounding box, based on most extreme pixel/sample position in the box. However, for certain types of primitives which span diagonally across the bounding box (e.g., "skinny" primitives having one edge which is significantly smaller than the other two), this results in the selection of min/max coordinates which are significantly different from the true min/max of the primitive, generating a more conservative range than necessary and resulting in a lower occlusion rate.

Figure 23:
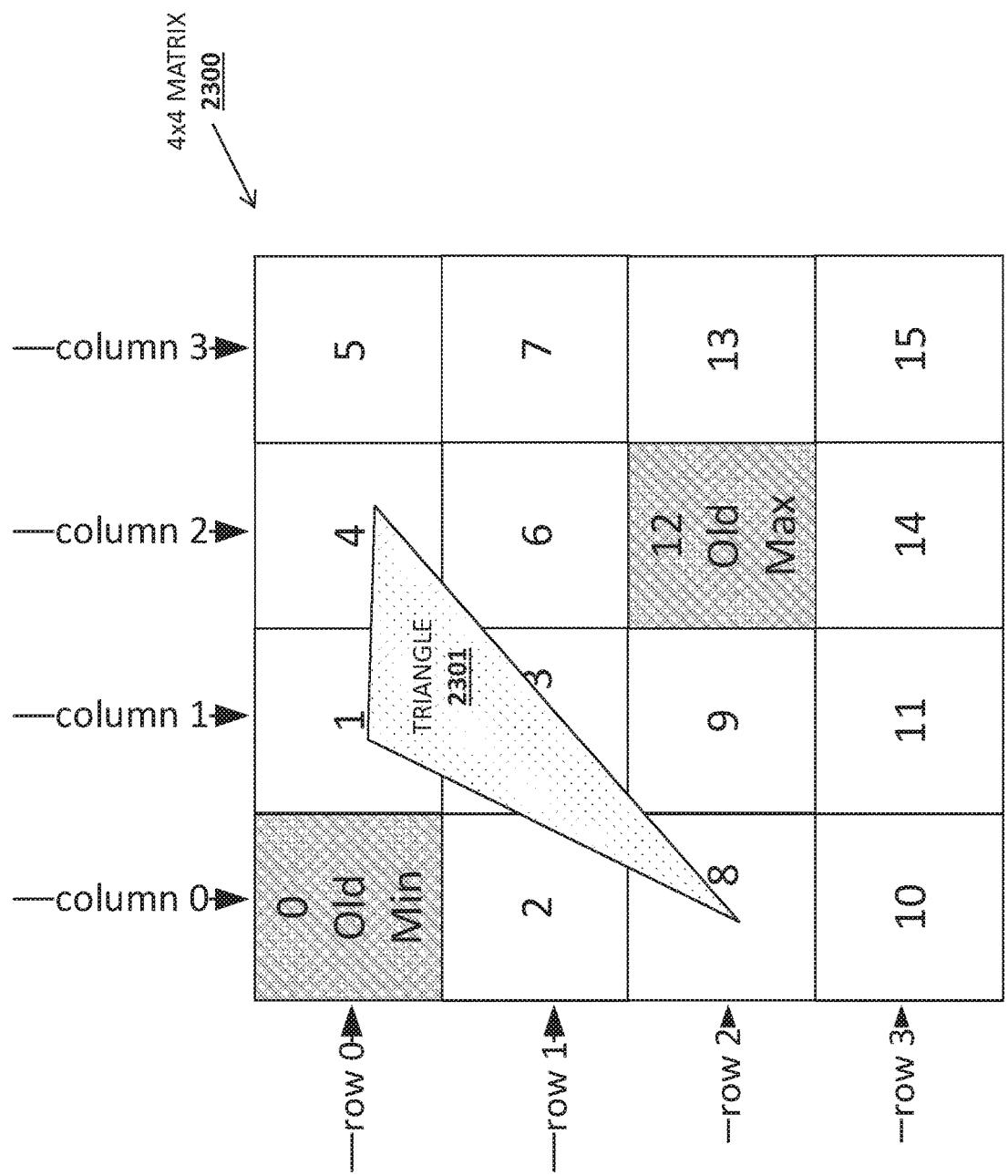
FIG. 23 illustrates an example in which max and min depth values are estimated for a 4×4 matrix.

FIG. 23 illustrates an example of how extreme min/max extents may be determined. A triangle 2301 is shown covering a portion of a 4×4 pixel tile 2300. The pixels are numbered 0-15 and individual pixels are identified by columns 0-3 and rows 0-3. Since the extreme x offset of the triangle 2301 is column2 and the y offset is row2, pixel12 is identified as the maximum value (provided Cx and Cy are positive). Similarly, pixel 0 is identified as the minimum value. However, neither of these two pixels are actually lit, resulting in a minimum value less than the true minimum of the triangle 2301 and a maximum which is greater than the true maximum. Alternatively, a brute force approach of calculating the min and max at every possible pixel of the tile is extremely costly from both an area and a latency perspective.

To address this inefficiency, one embodiment of the invention determines the min/max values per incoming primitive based on an estimate of what these values will be during the actual per-pixel depth testing later in the graphics pipeline. In one embodiment, the min/max values for each N×N block of pixels is computed. The depth value at any given pixel can be determined by the plane equation:

$$Z=x*Cx+y*Cy+Cref.$$

where Cx and Cy are the plane coefficients in the x and y dimensions, respectively. For primitives which do not fully cover the tile, the min and max depth values are determined based on the lit (x,y) coordinates. The "lit" pixels in the tile may be identified from a "coverage mask" generated by the rasterizer which identifies pixels which are fully or partially covered by the primitive (fully or partially "lit", respectively). One embodiment selects the lit (x,y) coordinates in the tile which would correspond to the min and max depth values by recursively comparing the Cx vs Cy at each lit coordinate. Since Cref is constant additive component for each point in pixel tile, the full z value does not need to be computed at each point. Rather, this embodiment compares the Cx and Cy values which are offset by x/y at each point.

Figure 24:
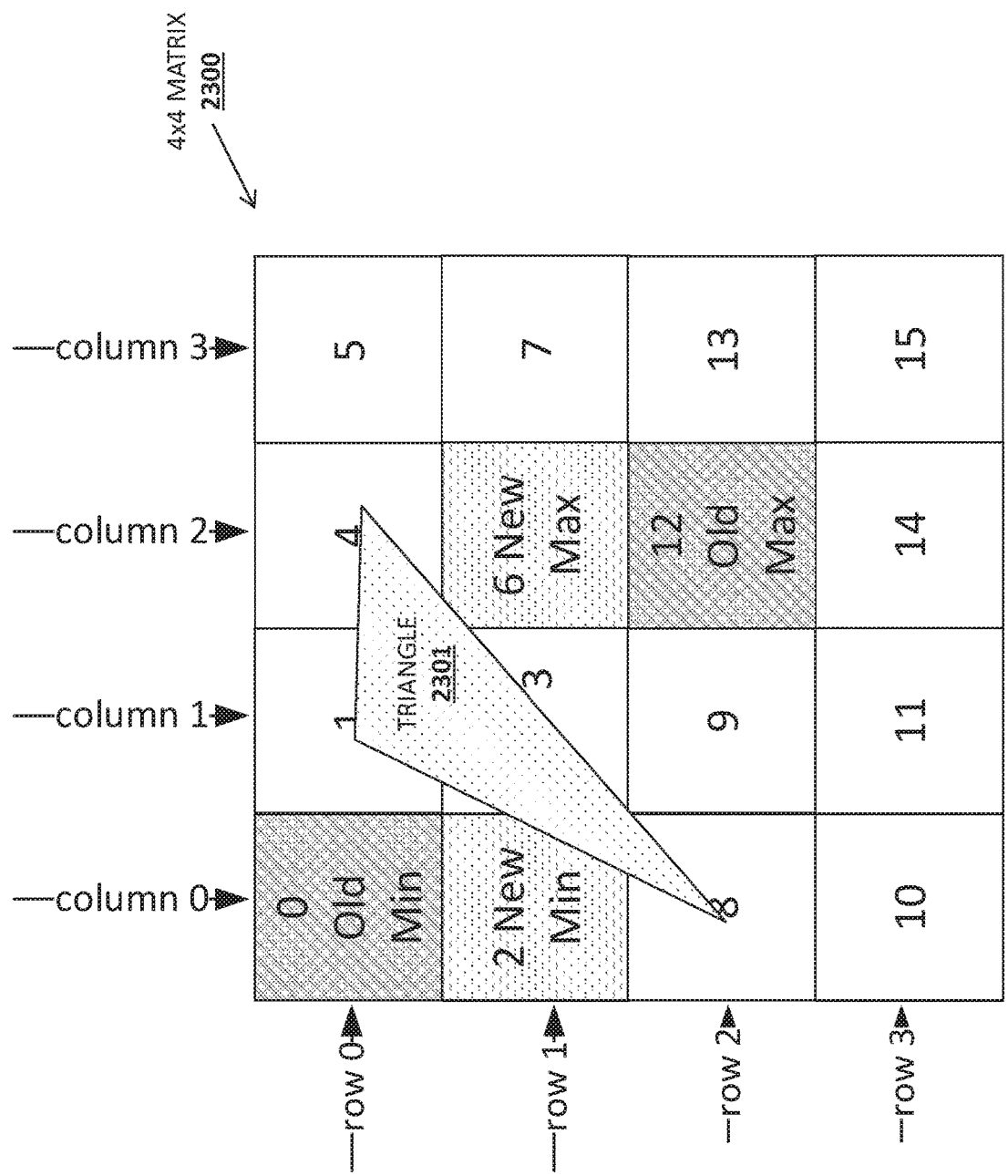
FIG. 24 illustrates a max/min depth determination resulting from one embodiment of the invention.

FIG. 24 illustrates how this comparison of Cx and Cy can effectively shrink the range and bring the min and max closer to their actual values. Since Pixel 12 is not lit and can possibly not contribute to the max value, the two nearest candidates for the max value are pixel 6 and pixel 9. According to the plane equation:

$$Z(6)=Z(3)+Cx\cdot 1+Cy\cdot 0=Z(3)+Cx$$

$$Z(9)=Z(3)+Cx\cdot 0+Cy\cdot 1=Z(3)+Cy$$

If Cx>Cy, the Z increase is greater in the horizontal direction and pixel 6 can be marked as the maximum. Similarly, it can be determined that pixel 1 is greater than pixel 2 to identify pixel 2 as the minimum. Thus, with just one comparator to compare Cx and Cy, a value closer to the true min/max values can be determined, resulting in reduced ambiguity and higher efficiency during hierarchical depth testing. Culling at HiZ is a very effective means of gaining performance since it can reduce the processing resources required for per-pixel/sample depth testing.

Figure 25:
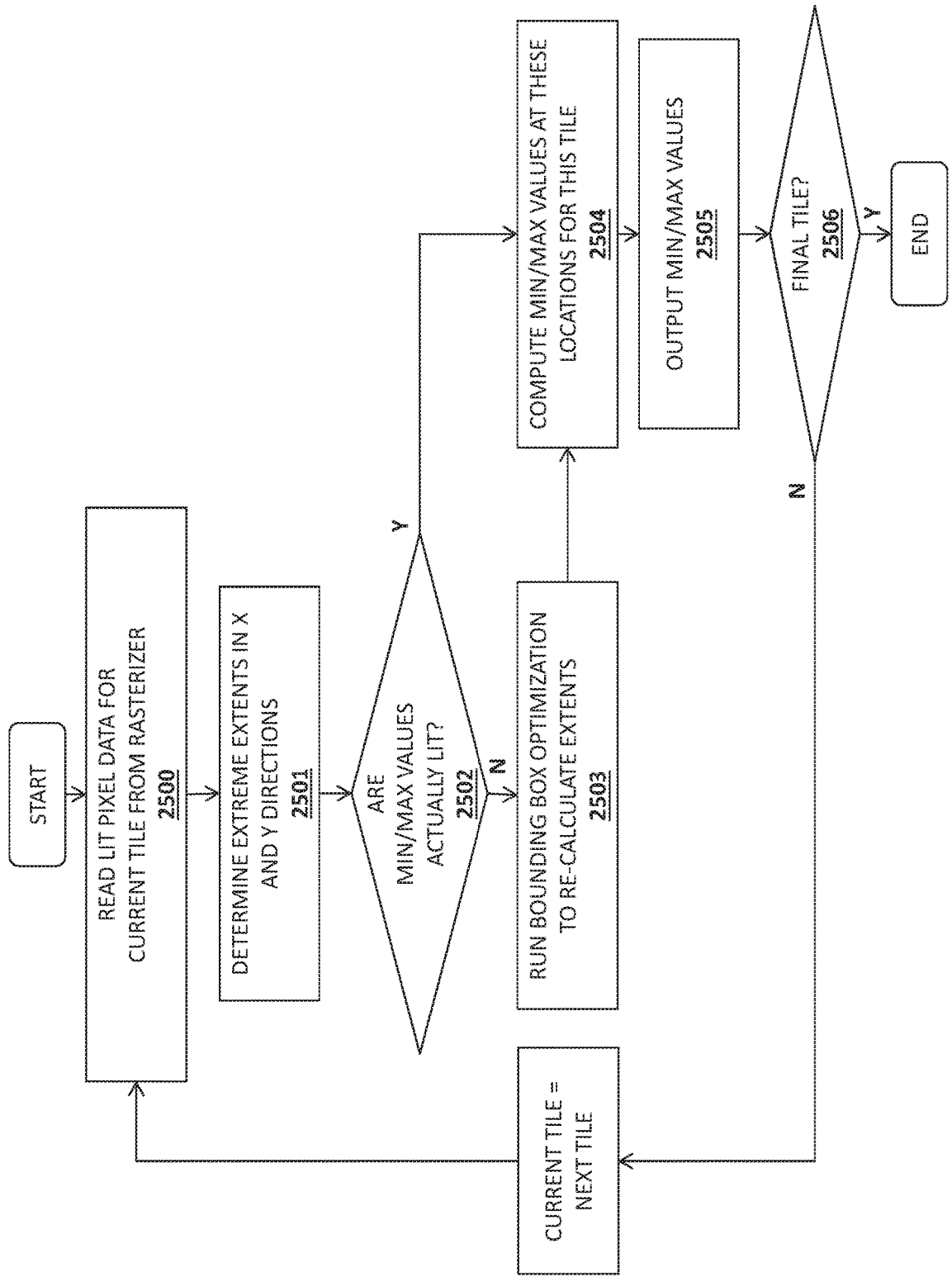
FIG. 25 illustrates a method in accordance with one embodiment of the invention.

FIG. 25 illustrates a method in accordance with one embodiment to compute a more precise min/max. The method may be implemented on the architectures described herein but is not limited to any particular architecture.

Lit pixel data is read from the rasterizer for the current pixel tile at 2500. At 2501 extreme extents are determined in the X and Y directions. At 2502, the current min/max values are analyzed as described herein to determine if they are actually lit. If not, then bounding box optimization is performed to re-calculate the extents at 2503. At 254, the min/max values are determined at these locations for the current pixel tile and the min/max values are output/stored at 2505 (e.g., in the HiZ buffer). If the pixel tile is not the final pixel tile in the image, determined at 2506, then the process returns to 252600 for the next pixel tile.

Figure 26:
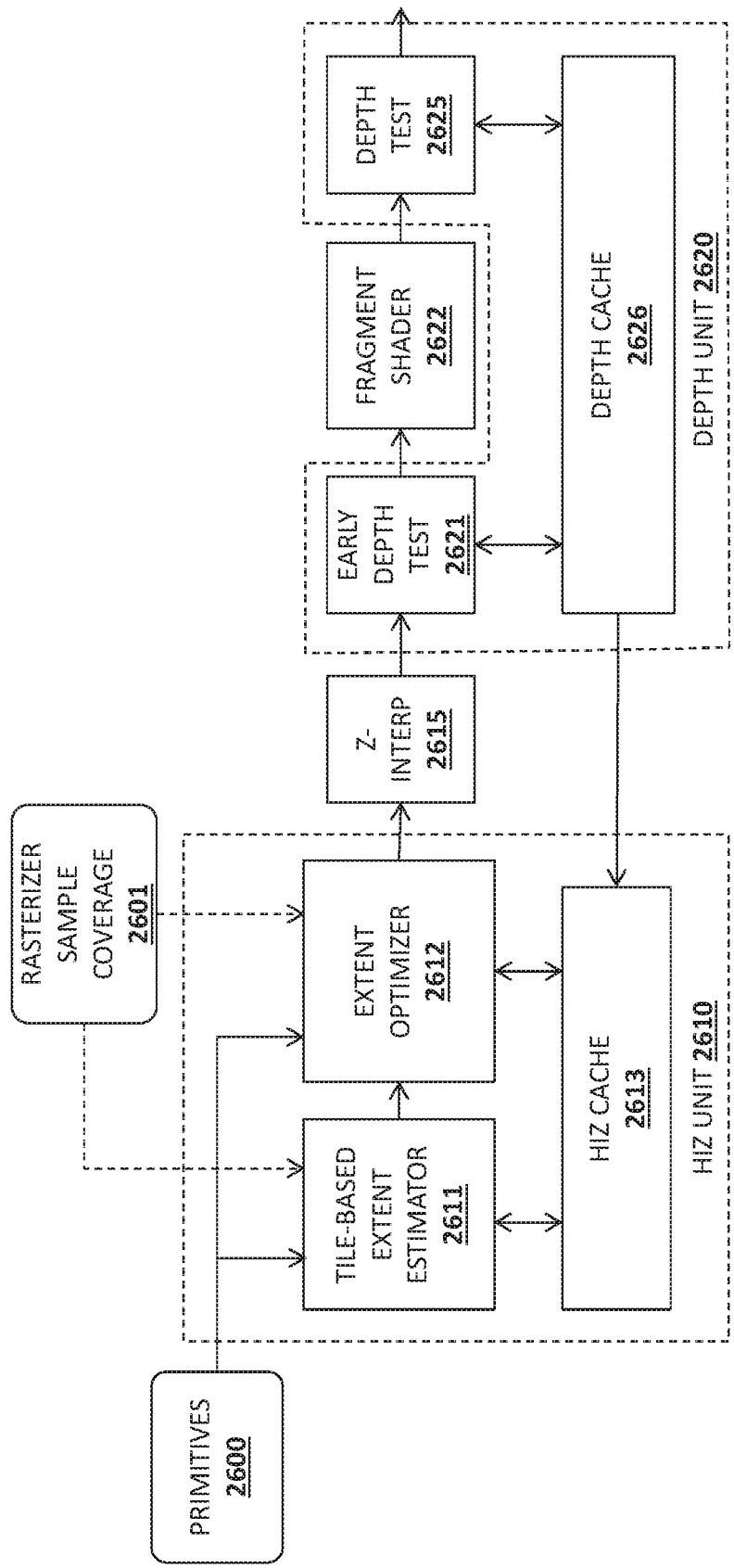
FIG. 26 illustrates one embodiment of the invention for optimizing depth estimations.

FIG. 26 illustrates a portion of a graphics pipeline in accordance with one embodiment of the invention HiZ unit 2610 for performing the optimization techniques described herein to determine more accurate min/max values, and a depth unit 620 to perform per-pixel depth testing. In the illustrated embodiment, a tile-based extent (min/max) estimator 611 determines the extreme X and Y extents for each incoming primitive 2600 using the techniques described above with respect to FIGS. 15-24. For example, in response to the scenario shown in FIG. 24, the tile-based extent estimator 2611 identifies pixels 0 and 12 of the 4×4 pixel matrix 2300 as the minimum and maximum values, respectively, for the incoming triangle 2301.

In one embodiment, an extent optimizer 2612 comprising one or more comparator circuits performs the optimization techniques described herein when specified conditions are met. For example, as described above, the min/max optimizer 612 may perform a comparison of Cx and Cy to effectively shrink the range and bring the min and max closer to their actual values. If Cx>Cy, the Z increase is greater in the horizontal direction and pixel 6 is marked as the maximum while pixel 2 is marked as the minimum because pixel 1 is greater than pixel 2. Thus, the min/max optimizer 2612 identifies min/max estimates which are closer to the true min/max values by performing a single comparison operation which will result in less ambiguity during hierarchical depth testing by the HiZ unit 2610 and a more accurate HiZ cache 2613. Culling at the HiZ unit 2610 is a very effective means of gaining performance, since it prevents the depth unit 2620 from performing per-pixel/sample depth testing on occluded pixels.

The other components in FIG. 27 may operate as in existing implementations. For example, the depth unit 2720 performs per-pixel depth testing, storing updates to a depth cache 2726. Depth data for a primitive being rendered is compared against depth data in the depth cache 2726 by early depth test circuitry/logic 2721. If the early depth test, a fragment shader 2722 may perform specified shading operations on image fragments (e.g., tiles, pixels). The resulting shaded pixels are then subjected to the final depth test circuitry/logic 2725 which performs pixel depth tests using data from the depth cache 2726.

A code sequence comprising operations performed by the HiZ unit 2710 to implement the techniques described herein is provided below. Min is denoted by X_upper_left (x_ul), Y_upper_left (y_ul). Max is denoted by X_lower_right (x_lr), Y_lower_right (y_lr). Note that the entire algorithm is a flat compare in parallel for all four coordinates and therefore may be performed in the same clock.

```
(cx positive, cy positive) || (cx negative, cy negative)
if ((|cx|>=|cy|))
{
new_x_lr = x_lr
new_y_lr = y_lr - 1
}
```

-continued

```
else
{
new_y_lr = y_lr
new_x_lr = x_lr - 1
}
if(|cx|>=|cy|)
{
new_x_ul=x_ul
new_y_ul = y_ul+1
}
else
{
new_y_ul = y_ul
new_x_ul = x_ul+1
}
(cx positive, cy negative) || (cx negative, cy positive)
if ((|cx|>=|cy|)
{
new_x_lr = x_lr
new_y_ul = y_ul+1
}
else
{
new_y_ul = y_ul
new_x_lr = x_lr -1
}
if(|cx|>|cy|)
{
new_x_ul=x_ul
new_y_lr = y_lr-1
}
else
{
new_y_lr = y_lr
new_x_ul = x_ul+1
}
```

Thus, the embodiments described above implement extremely efficient, low-cost techniques to significantly improve coarse depth testing and processing. In particular, by utilizing a coverage mask and performing a single comparison between two coefficients, the accuracy of min/max determinations is dramatically improved.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.).

In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. An apparatus comprising:
    a rasterizer to rasterize primitives of a current graphics image to generate pixels, the rasterizer to further generate coverage data associated with a first primitive to identify pixels in a first tile of pixels which are partially covered or fully covered by the first primitive;
    a coarse depth unit to estimate minimum (min) and maximum (max) depth values associated with the first primitive, the coarse depth unit comprising:
        an extent estimator to determine potential min and/or max depth values for the first primitive at edges of a bounding box surrounding the first primitive within the first the; and
        an extent optimizer to adjust the potential min and/or max depth values to be closer to actual min and/or max depth values, respectively, upon a determination that the potential min and/or max depth values identify one or more pixels which are not partially or fully covered by the first primitive;
        the extent optimizer to determine how to adjust the potential min and/or max depth values closer to the actual min and/or max depth values within an X, Y, and Z coordinate system by performing a comparison of X and Y coefficient values associated with the first tile, the X and Y coefficient values comprising Cx and Cy in the plane equation Z=x*Cx+y*Cy+Cref, the Cref comprising a constant additive component;
    wherein the extent optimizer is to choose a first pair of pixels for the potential min and/or max depth values when Cx>Cy and to choose a second pair of pixels for the potential min and/or max depth values when Cx<Cy.

2. The apparatus of claim 1, wherein the extent optimizer is to determine that the potential min and/or max depth values identify a pixel which is not partially or fully covered by the first primitive by reading at least a portion of the coverage data related to the pixel which is not partially or fully covered by the first primitive.

3. The apparatus of claim 1, wherein each tile comprises a matrix of 4×4 pixels or 8×8 pixels.

4. The apparatus of claim further comprising:
    a coarse depth cache to store per-tile min and/or max depth data, the coarse depth unit to compare the potential min and/or max depth values associated with the first primitive with the per-tile min and/or max depth data in the coarse depth cache to determine whether the first primitive will be occluded.

5. The apparatus of claim 1, wherein the coarse depth unit is to cull the first tile if the first primitive will be occluded.

6. The apparatus of claim 1, further comprising:
    a depth cache to store per-pixel depth data; and
    depth test circuitry to compare depth values for one or more current pixels with corresponding depth data in the depth cache to determine whether the one or more current pixels are occluded.

7. The apparatus of claim 6, wherein the depth test circuitry is to cull the one or more current pixels which are determined to be occluded.

8. A method comprising:
    rasterizing primitives of a current graphics image to generate pixels;
    generating coverage data associated with a first primitive to identify pixels in a first the of pixels which are partially covered or fully covered by the first primitive;
    estimating potential minimum (min) and maximum (max) depth values for the first primitive at edges of a bounding box surrounding the first primitive within the first tile;
    adjusting the potential min and/or max depth values to be closer to actual min and/or max depth values, respectively, upon a determination that the potential min and/or max depth values identify one or more pixels which are not partially or fully covered by the first primitive;
    determining how to adjust the potential min and/or max depth values closer to the actual min and/or max depth values within an X, and Z coordinate system by performing a comparison of X and Y coefficient values associated with the first tile, the X and Y coefficient values comprising Cx and Cy in the plane equation Z=x*Cx+y*Cy+Cref, the Cref comprising a constant additive component;
    choosing a first pair of pixels for the potential min and/or max depth values when Cx>Cy; and
    choosing a second pair of pixels for the potential min and/or max depth values when Cx<Cy.

9. The method of claim 8, further comprising: determining that the potential min and/or max depth values identify a pixel which is not partially or fully covered by the first primitive by reading at least a portion of the coverage data related to the pixel which is not partially or fully covered by the first primitive.

10. The method of claim 8, wherein each tile comprises a matrix of 4×4 pixels or 8×8 pixels.

11. The method of claim 8, further comprising:
    storing per-tile min and/or max depth data in a coarse depth cache; and
    comparing the potential min and/or max depth values associated with the first primitive with the per-tile min and/or max depth data in the coarse depth cache to determine whether the first primitive will be occluded.

12. The method of claim 8, further comprising:
    culling the first tile if the first primitive will be occluded.

13. The method of claim 8, further comprising:
storing per-pixel depth data in a depth cache; and
comparing depth values for one or more current pixels with corresponding depth data in the depth cache to determine whether the one or more current pixels are occluded.

14. The method of claim 13, further comprising: culling the one or more current pixels which are determined to be occluded.

15. An article of manufacture comprising a non-transitory machine-readable storage medium having program code stored thereon which, when executed by a machine, causes the machine to perform the operations of:
rasterizing primitives of a current graphics image to generate pixels;
generating coverage data associated with a first primitive to identify pixels in a first the of pixels which are partially covered or fully covered by the first primitive;
estimating potential minimum (min) and maximum (max) depth values for the first primitive at edges of a bounding box surrounding the first primitive within the first the;
adjusting the potential min and/or max depth values to be closer to actual min and/or max depth values, respectively, upon a determination that the potential min and/or max depth values identify one or more pixels which are not partially or fully covered by the first primitive;
determining how to adjust the potential min and/or max depth values closer to the actual min and/or max depth values within an X, Y, and Z coordinate system by performing a comparison of X and Y coefficient values associated with the first tile, the X and Y coefficient values comprising $C_x$ and $C_y$ in the plane equation $Z=x*C_x+y*C_y+C_{ref}$, the $C_{ref}$ comprising a constant additive component;
choosing a first pair of pixels for the potential min and/or max depth values when $C_x > C_y$; and choosing a second pair of pixels for the potential min and/or max depth values when $C_x < C_y$.

16. The article of manufacture of claim 15, wherein the operations further comprise:
determining that the potential min and/or max depth values identify a pixel which is not partially or fully covered by the first primitive by reading at least a portion of the coverage data related to the pixel which is not partially or fully covered by the first primitive.

17. The article of manufacture of claim 15, wherein each tile comprises a matrix of 4×4 pixels or 8×8 pixels.

18. The article of manufacture of claim 15, wherein the operations further comprise:
storing per-tile min and/or max depth data in a coarse depth cache; and
comparing the potential min and/or max depth values associated with the first primitive with the per-tile min and/or max depth data in the coarse depth cache to determine whether the first primitive will be occluded.

19. The article of manufacture of claim 15, wherein the coarse depth unit is to operations further comprise:
culling the first tile if the first primitive will be occluded.

20. The article of manufacture of claim 15, wherein the operations further comprise:
storing per-pixel depth data in a depth cache; and
comparing depth values for one or more current pixels with corresponding depth data in the depth cache to determine whether the one or more current pixels are occluded.

21. The article of manufacture of claim 20, wherein the operations further comprise:
culling the one or more current pixels which are determined to be occluded.

\* \* \* \* \*